US012134529B1

(12) United States Patent
Lee

(10) Patent No.: US 12,134,529 B1
(45) Date of Patent: Nov. 5, 2024

(54) LAUNDRY DELIVERY DEVICE

(71) Applicant: Cheongse Co., Ltd., Iksan-si (KR)

(72) Inventor: Gi Tae Lee, Jeonju-si (KR)

(73) Assignee: Cheongse Co., Ltd., Iksan-si (KR)

( * ) Notice: Subject to any disclaimer, the term of this patent is extended or adjusted under 35 U.S.C. 154(b) by 0 days.

(21) Appl. No.: 18/636,307

(22) Filed: Apr. 16, 2024

(30) Foreign Application Priority Data

Jun. 12, 2023 (KR) .......................... 10-2023-0074621

(51) Int. Cl.
*B65G 49/00* (2006.01)
*B65G 47/86* (2006.01)

(52) U.S. Cl.
CPC .......... *B65G 49/00* (2013.01); *B65G 47/842* (2013.01); *B65G 2201/0229* (2013.01)

(58) Field of Classification Search
CPC ...... B65G 49/00; B65G 49/05; B65G 47/842; B65G 47/841; B65G 47/52; B65G 2201/0229; B65G 2201/00; A47G 25/02; A47G 25/1442; A47G 25/06
See application file for complete search history.

(56) References Cited

U.S. PATENT DOCUMENTS

| | | | | |
|---|---|---|---|---|
| 3,151,730 A | * | 10/1964 | Bunten | B65G 47/487 198/465.4 |
| 3,557,935 A | * | 1/1971 | Gerisch | B65G 19/025 198/465.4 |
| 3,762,602 A | * | 10/1973 | Wasil | A47G 25/1442 222/312 |
| 3,917,112 A | * | 11/1975 | Willis | D06F 95/00 221/195 |
| 4,022,338 A | * | 5/1977 | Laursen | B65G 47/61 294/82.35 |
| 11,084,658 B2 | * | 8/2021 | Stauber | B65G 17/485 |

FOREIGN PATENT DOCUMENTS

| | | | | |
|---|---|---|---|---|
| EP | 2130789 A1 | * | 12/2009 | .......... B65G 1/0457 |
| KR | 1020080069720 A | | 7/2008 | |
| KR | 101588416 B1 | | 1/2016 | |
| KR | 1020190108945 A | | 9/2019 | |
| WO | WO-2021181185 A1 | * | 9/2021 | ............. A41H 43/02 |

* cited by examiner

*Primary Examiner* — Ismael Izaguirre
(74) *Attorney, Agent, or Firm* — NKL LAW; Jae Youn Kim

(57) ABSTRACT

Provided is a laundry delivery device that can automatically and easily deliver laundry requested for delivery to a customer without the need for a worker to separate and deliver the laundry, and thus greatly improve the work efficiency of the worker, the laundry delivery device including a conveyor transporting a hanger with laundry requested for delivery to a shipping location; and an actuator allowing the hanger with the laundry requested for delivery transferred to the shipping location by the conveyor to be separated from the conveyor.

14 Claims, 22 Drawing Sheets

LAUNDRY DELIVERY DEVICE

CROSS REFERENCE TO RELATED APPLICATION

The present application claims priority to Korean Patent Application No. 10-2023-0074621, filed Jun. 12, 2023, the entire contents of which is incorporated herein for all purposes by this reference.

BACKGROUND OF THE INVENTION

Field of the Invention

The present invention relates to a laundry delivery device that can automatically and easily deliver laundry requested for delivery to a customer without the need for a worker to separate and deliver the laundry, and thus greatly improve the work efficiency of the worker.

Description of the Related Art

Generally, when a launderer receives laundry from a customer, it enters customer information in a ledger and issues an invoice.

Meanwhile, when the launderer attaches a number tag with the invoice number to the laundry and completes the washing, the launderer pre-marks a recognition code consisting of letters or symbols that signify a specific section, enters the invoice number and the identification code in the ledger, and then hangs the laundry in the specific section.

In such situation, when the customer visits the launderer with the invoice on the desired due date or time, the launderer should read the ledger and visually check which section the customer's laundry is hanging in, go back to the corresponding section, find the laundry, settle the amount, and then deliver the laundry to the customer.

When adopting such a traditional laundry delivery method, although it can be operated to a certain extent despite inconveniences in the case of small businesses, it has the disadvantage of causing a decrease in work efficiency because it is difficult to manage the laundry and customers and it takes a considerable amount of time to search for the laundry in the case of large-scale businesses.

In order to solve these problems, a laundry transport conveyor system using RF tags that automatically transfers a specific laundry to the shipping location by applying the RF method to a transfer conveyor with multiple laundries to reduce the time it takes to find laundry has been proposed in Korean Patent Publication No. 10-2008-0069720.

However, in the case of the above-mentioned Korean Patent Publication No. 10-2008-0069720, there is a problem in that work efficiency is reduced due to the inconvenience of workers having to go directly to the shipping location and directly deliver the laundry to the customer.

DOCUMENTS OF RELATED ART (Patent Document 1) Korean Patent Application Publication No. 10-2008-0069720

SUMMARY OF THE INVENTION

Accordingly, the present invention has been made keeping in mind the above problems occurring in the related art, and an objective of the present invention is to provide a laundry delivery device that can automatically and easily deliver laundry requested for delivery to customers without the need for a worker to separate and deliver it, and thus greatly improve the work efficiency of the worker.

In order to achieve the above objective, the present invention provides a laundry delivery device including a conveyor transporting a hanger with laundry requested for delivery to a shipping location; and an actuator allowing the hanger with the laundry requested for delivery transferred to the shipping location by the conveyor to be separated from the conveyor.

Preferably, the conveyor is configured to include a slot for hanging a hook of the hanger with the laundry requested for delivery.

More preferably, the actuator is configured to include a cylinder that grips and releases a hook of the hanger with the laundry requested for delivery through a finger provided on a front, and moves up and down in a state that is inclined downward toward a bottom of the conveyor; a lifting cylinder disposed to be inclined downward along the cylinder to lift the cylinder; and a transport cylinder including a carrier that transports the cylinder in forward and backward directions together with the lifting cylinder.

More preferably, the finger of the cylinder is consisted of a pair of fingers; a mounting shaft is provided in a front of one of the pair of fingers in a state of horizontally penetrating the front of the one finger to allow a hook of the hanger with the laundry requested for delivery to be mounted; and an insertion hole into which the mounting shaft is inserted is formed on a front of the other finger of the pair of fingers.

More preferably, an inclined surface is formed to be gradually inclined toward an inside of the mounting shaft as it moves from the front of one finger to the front of the other finger, on an outer peripheral surface of the mounting shaft located between the front of one finger and the front of the other finger.

More preferably, an inclined surface is formed to be inclined along the inclined surface of the mounting shaft on an inner peripheral surface of the insertion hole formed on the front of the other finger.

More preferably, the cylinder is consisted of a plurality of cylinders; and the transport cylinder includes an upper transport frame which has a rear fixed to the carrier and a front fixed to the lifting cylinder and is transported in forward and backward directions together with the lifting cylinder and the cylinder by the carrier; and a lower transport frame which has a rear connected to a rod of the lifting cylinder and a plurality of the cylinders provided at regular intervals on an upper surface and is transported in forward and backward directions together with the upper transport frame.

More preferably, a front of the upper transport frame is inclined downward toward a bottom of the conveyor; and the lifting cylinder moves up and down on the front of the upper transport frame to be fixed in an adjusted position.

To this end, more preferably, a guide slit extending a certain length in a vertical direction of the lifting cylinder is formed on the front of the upper transport frame; and the lifting cylinder moves up and down on the front of the upper transport frame to be fixed in an adjusted position by a position fixing member fastened to the lifting cylinder in a state that penetrates the guide slit.

More preferably, the device further includes a support portion that receives the hanger with the laundry requested for delivery separated from the conveyor through the actuator and supports the hanger at a certain height.

More preferably, the support portion includes a frame allowing the hanger with the laundry requested for delivery separated from the conveyor by the actuator to be transported at a certain height to a shipping position formed inside; an auxiliary frame provided on an upper part of the frame and having the actuator provided on a lower part thereof; a guide frame extending a certain length from one side to the other side of the frame to be horizontally fixed at a certain height to one side of the frame; a moving frame provided inside the guide frame to be move left and right from one side to the other side of the guide frame and from the other side to one side of the guide frame, and accommodated inside the hook of the hanger with the laundry requested for delivery to receive the laundry requested for delivery separated from the conveyor through the actuator and support it at a certain height; a lower cylinder provided at a lower part of the guide frame to move the moving frame from one side to the other side of the guide frame and from the other side to one direction of the guide frame; a support frame horizontally provided at a certain height on the other side of the frame and accommodated inside the hook of the hanger with the laundry requested for delivery to receive the laundry requested for delivery from the moving frame and support it at a certain height; and an upper cylinder provided on an upper part of the moving frame to be moved left and right together with the moving frame, and moves the hanger with the laundry requested for delivery from the moving frame toward the support frame.

More preferably, the support frame includes a horizontal support frame provided horizontally at a certain height on the other side of the frame; and an inclined support frame formed to be inclined upward at a certain length from one side of the horizontal support frame to the other side of the moving frame.

More preferably, the support portion further includes an auxiliary moving frame that moves from one side to the other side of the moving frame and from the other side to one side of the moving frame by the rod of the upper cylinder in a state that is provided in the rod of the upper cylinder and has the moving frame accommodated inside, so that the hanger with the laundry requested for delivery is moved from the moving frame toward the support frame.

More preferably, a door is provided on a rear of the support portion to open and close the shipping location formed inside the support portion.

More preferably, the device further includes a door cylinder provided to move the door from one side to the other side of the support portion and from the other side to one direction of the support portion at the rear of the support portion.

The present invention has an effect that can automatically separate, from the conveyor through the actuator, the hanger with the laundry requested for delivery which has been transferred to the shipping location L by the conveyor, without the need for the worker to manually separate the laundry, so that it may be delivered to the customers, thereby greatly improving the work efficiency of the worker.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Hereinafter, preferred embodiments of the present invention will be described in more detail based on the attached drawings. Of course, the scope of the present invention is not limited to the following examples, but may be modified and implemented in various methods by those skilled in the art without departing from the technical gist of the present invention.

Figure 1:
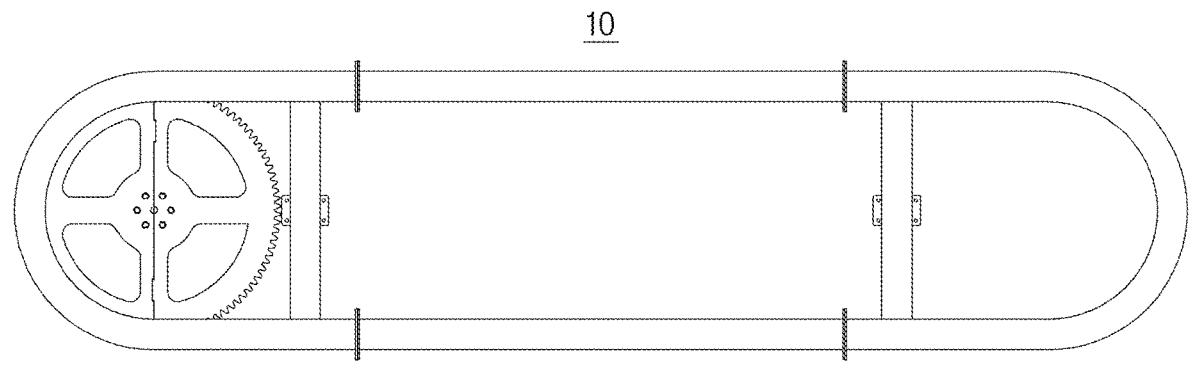
FIG. 1 is a plan view schematically showing a conveyor of a laundry delivery device according to an embodiment of the present invention.
Figure 2:
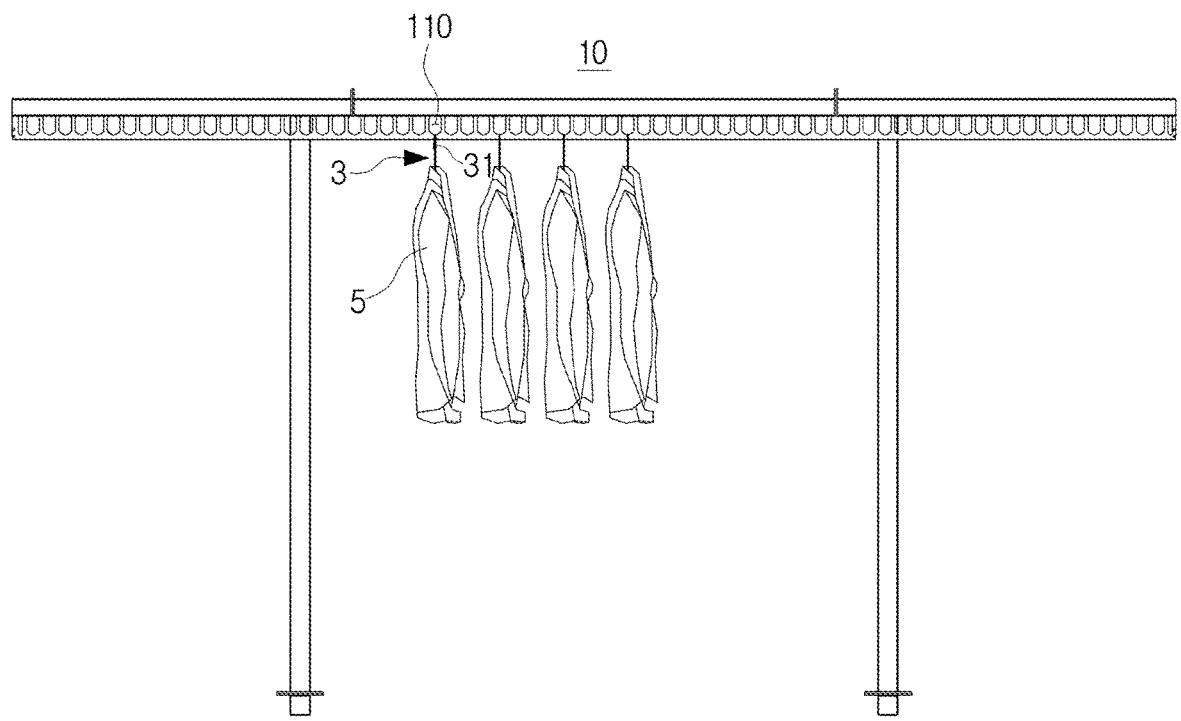
FIG. 2 is a side view schematically showing the conveyor.

FIG. 1 is a plan view schematically showing a conveyor of a laundry delivery device according to an embodiment of the present invention; and FIG. 2 is a side view schematically showing the conveyor.

A laundry delivery device according to an embodiment of the present invention includes a conveyor 10 and an actuator.

First, the conveyor 10 is responsible for transferring a hanger 3 with laundry 5 requested for delivery to the shipping location, and may be configured to include various types of conveyors 10, such as a trolley conveyor including a plurality of slots 110 capable of hanging a hook 31 of the hanger 3 with the laundry 5 requested for delivery.

Figure 3:
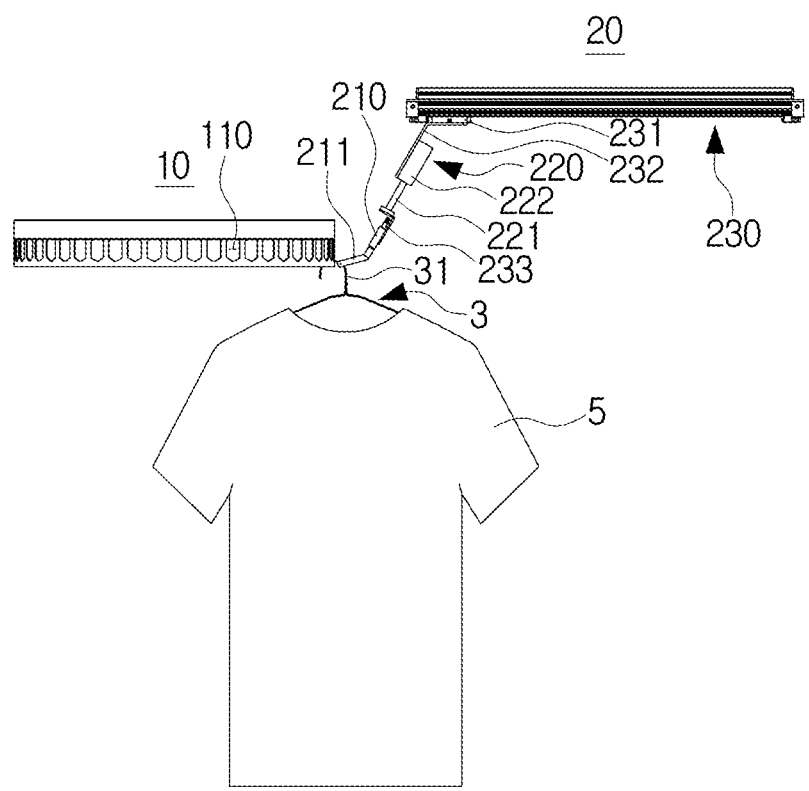
FIG. 3 is a side view schematically showing the conveyor and an actuator.
Figure 4:
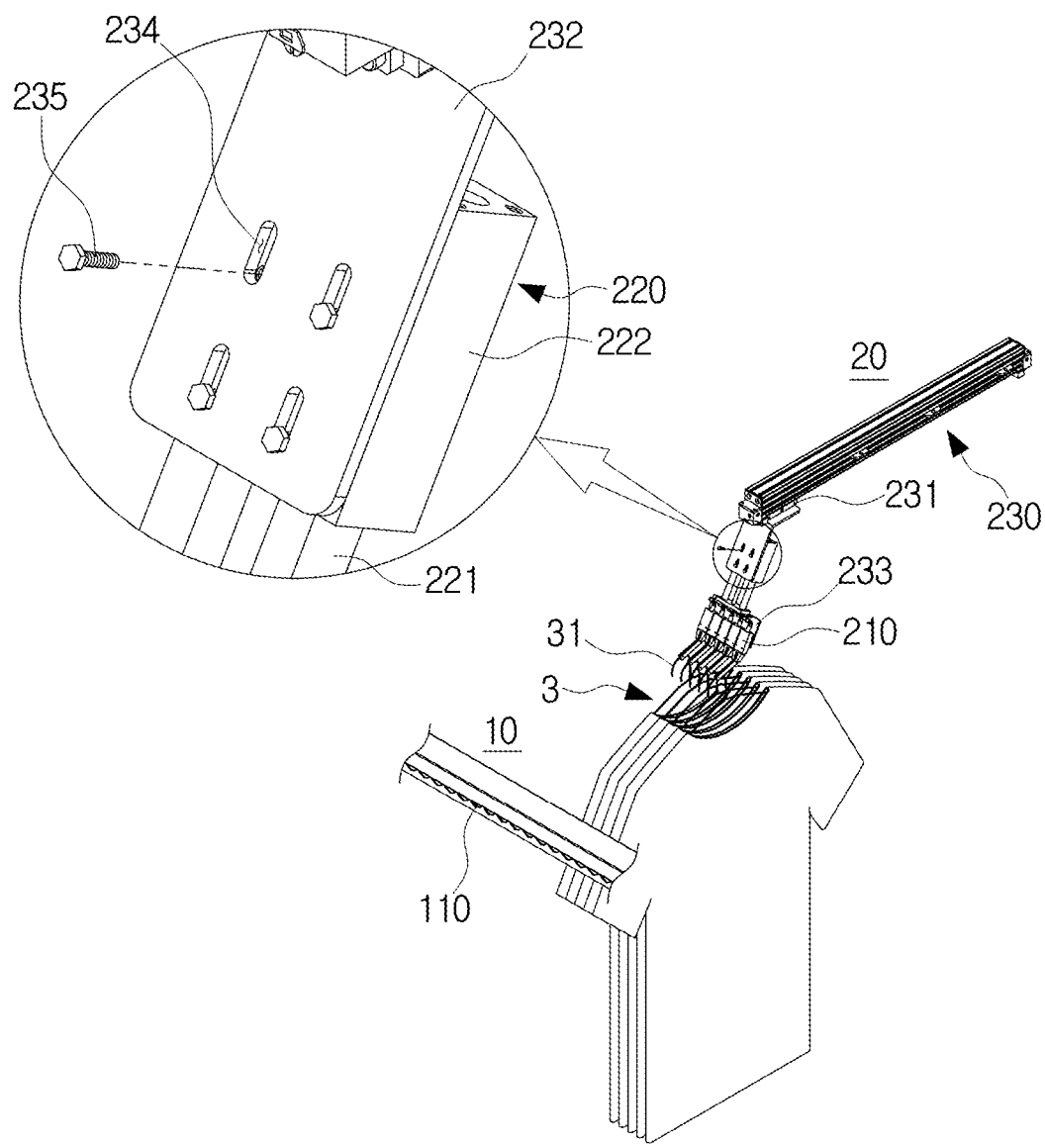
FIG. 4 is a perspective view schematically showing a state in which a hanger with a laundry requested for delivery are separated from the conveyor by then actuator.

FIG. 3 is a side view schematically showing the conveyor and an actuator; and FIG. 4 is a perspective view schematically showing a state in which a hanger with laundry requested for delivery is separated from the conveyor by an actuator.

An actuator 20 may be used to separate, from the conveyor 10, the hanger 3 with the laundry requested for delivery transferred to the shipping location by the conveyor 10, and may be configured to include a cylinder 210, a lifting cylinder 220, and a transport cylinder 230, as shown in FIGS. 3 and 4.

The cylinder 210 may be made of various types such as an air chuck cylinder, and may configured to grip and release the hook 31 of the hanger 3 with the laundry 5 requested for delivery through a pair of fingers 211 provided on the front of the cylinder 210, which may be made of various types, such as an air chuck cylinder.

The cylinder 210 may move up and down in a state that is inclined downward toward the bottom of the conveyor 10.

The lifting cylinder 220 is disposed to be inclined downward along the cylinder 210 to allow the cylinder 210 to be lifted.

The transport cylinder 230 may be made of various types, such as a rodless cylinder, that transports the cylinder 210 in the forward and backward directions of the cylinder 210 together with the lifting cylinder 220.

Figure 5:
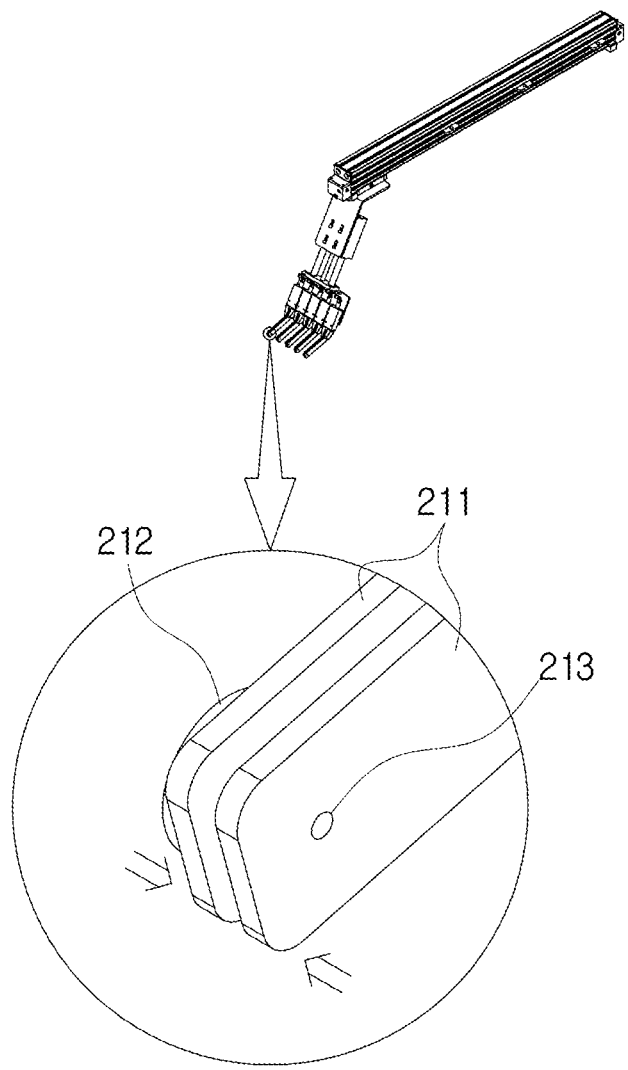
FIGS. 5 and 6 are perspective views schematically showing the operating process of a pair of fingers of the actuator in which a mounting shaft is provided on one of the pair of fingers of the actuator and an insertion hole is provided on the other finger.
Figure 6:
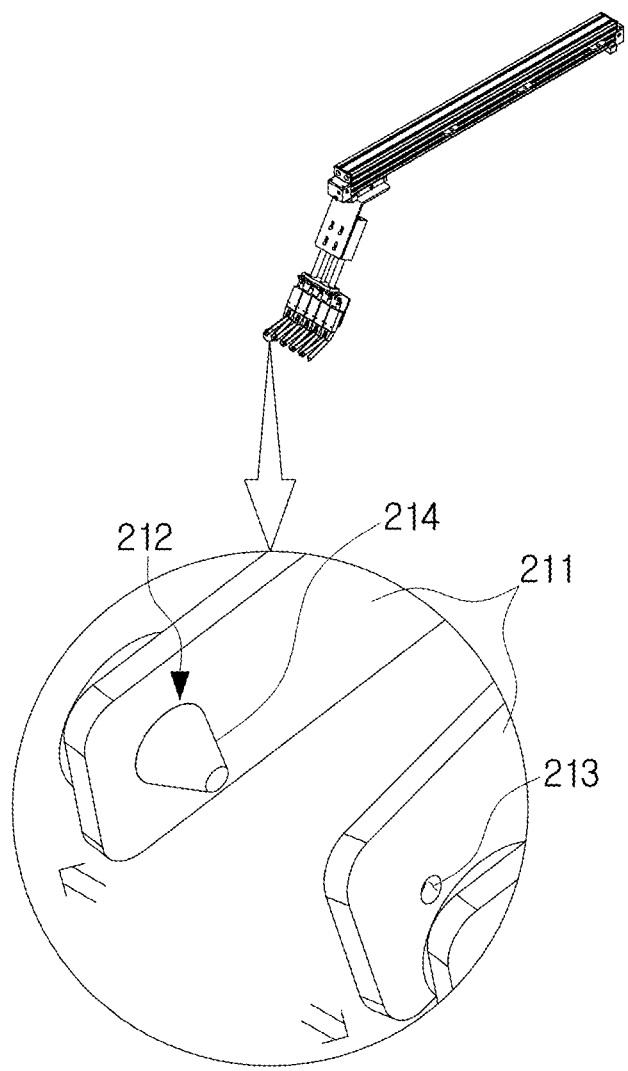

FIGS. 5 and 6 are perspective views schematically showing the operating process of a pair of fingers of the actuator in which a mounting shaft is provided on one of the pair of fingers of the actuator and an insertion hole is provided on the other finger.

In order to ensure that the hook 31 of the hanger 3 gripped by a pair of fingers 211 of the cylinder 210 may be detachably fastened between the pair of fingers 211, there may be provided with a mounting shaft 212 in the front of any one of the pair of fingers 211 to allow the hook 31 of the hanger 3 with the laundry 5 requested for delivery to be mounted, as shown in FIGS. 5 and 6.

The middle portion of the mounting shaft 212 may be coupled to the front of the one of the pair of fingers 211, using various methods, such as screwing or welding, in a state that the mounting shaft 212 horizontally penetrates the front of the one finger 211.

An insertion hole 213 into which a portion of the mounting shaft 212 located between the pair of fingers 211 is inserted may be formed in the front of the other finger of the pair of fingers 211.

Figure 7:
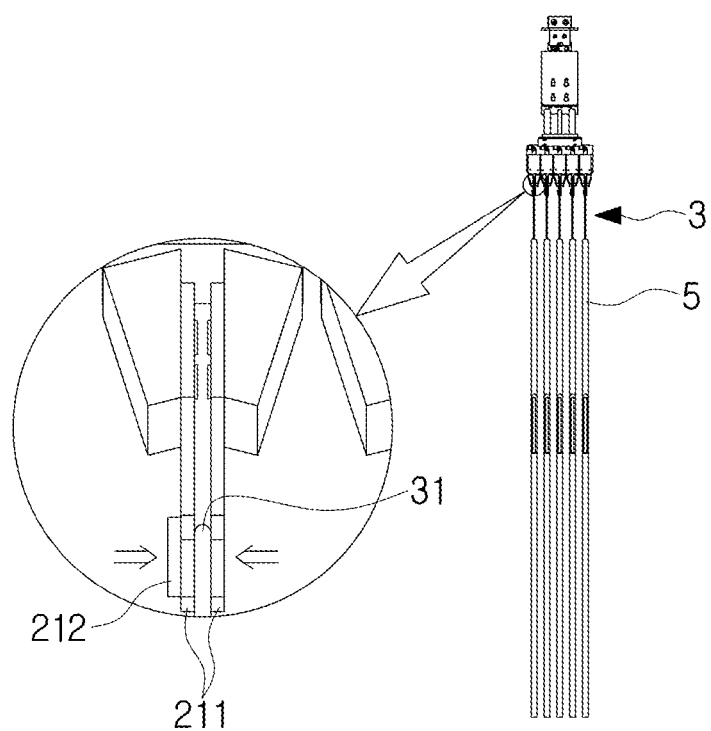
FIGS. 7 and 8 are front views schematically showing the operating process of a pair of fingers of the actuator in which a mounting shaft is provided on one of the pair of fingers of the actuator and an insertion hole is provided on the other finger.
Figure 8:
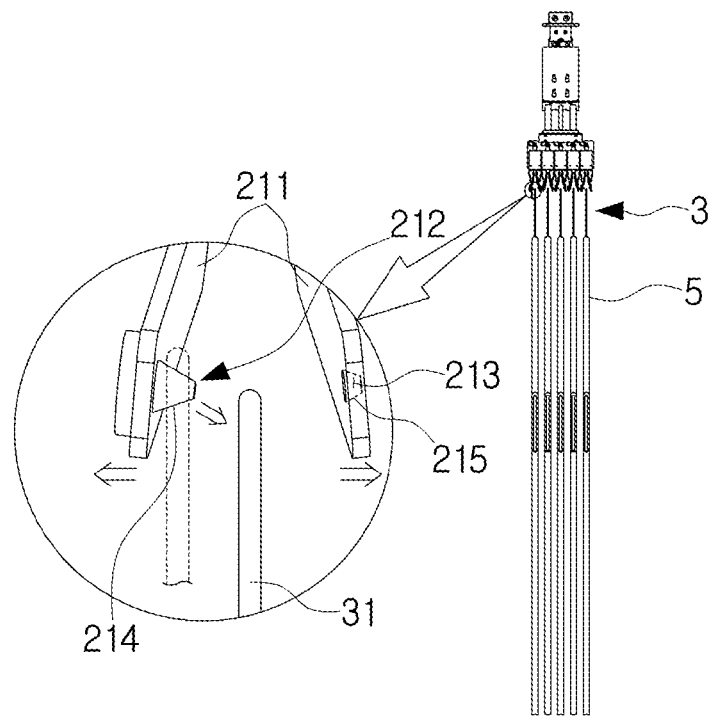

FIGS. 7 and 8 are front views schematically showing the operating process of a pair of fingers of the actuator in which a mounting shaft is provided on one of the pair of fingers of the actuator and an insertion hole is provided on the other finger.

Herein, when the pair of fingers 211 gripping the hook 31 of the hanger 3 with the laundry 5 requested for delivery is released as shown in FIGS. 7 and 8, in order to allow the hook 31 of the hanger 3 to be more easily separated from the mounting shaft 212, an annular inclined surface 214 may be formed on the outer peripheral surface of the mounting shaft 212 located between the front of one finger 211 and the front of the other finger 211.

The annular inclined surface 214 may be gradually inclined toward the inner side of the mounting shaft 212 as it moves from the front of one finger 211 to the front of the other finger 211.

In addition, in order to ensure that the mounting shaft 212 located between the front of one finger 211 and the front of the other finger 211 is more smoothly inserted into the insertion hole 213 formed on the front of the other finger 211, an annular inclined surface 215 may be formed to be inclined in the inner peripheral surface of the insertion hole 213 along the annular inclined surface 214 of the mounting shaft 212.

In order to allow the pair of fingers 211 of the cylinder 210 to more easily grip and release, at once, multiple hooks 31 of multiple hanger 3 on which each laundry 5 requested for delivery is hanged, the cylinder 210 may be consisted of a plurality of cylinders.

In addition, in order to ensure that the transport cylinder 230 may transport multiple hangers 3 on which each laundry 5 requested for delivery is hanged, the transport cylinder 230 may be configured to include an upper transport frame 232 and a lower transport frame 233, as shown in FIGS. 3 and 4.

The rear of the upper transport frame 232 may be fixed to the lower surface of the carrier 231 of the transport cylinder 230 using various methods, such as bolting or welding.

The cylinder body 222 of the lifting cylinder 220 may be fixed to the front lower surface of the upper transport frame 232 using various methods, such as bolting or welding.

The upper transport frame 232 may be transported by the carrier 231 in the forward and backward directions of the cylinder 210 along with the lifting cylinder 220 and the cylinder 210.

The rear side opposite to the front of the lower transport frame 233 may be fixed to the front of the rod 221 of the lifting cylinder 220 using various methods, such as bolting or welding.

The plurality of the cylinders 210 may be provided on the upper surface of the lower transport frame 233 at regular intervals from one side to the other side of the lower transport frame 233 using various methods, such as bolting or welding.

The lower transport frame 233 may be transported forward and backward together with the upper transport frame 232.

Then, in order to ensure that the hook 31 of the hanger 3 on which the laundry 5 requested for delivery is hanged may be smoothly separated from the slot 110 of the conveyor 10 by allowing it to be easily lifted by the lifting cylinder 220 in a state that causes the pair of fingers 211 of the cylinder 210 of the actuator 20 to grip the hook 31 of the hanger 3 with the laundry 5 requested for delivery transferred to the shipping location, the front of the upper transport frame 232 may be inclined downward toward the bottom of the conveyor 10.

In addition, in order to enabling smooth replacement of the lifting cylinder 220 from the upper transport frame 232, as well as to more easily adjust the position of the lifting cylinder 220 according to the height difference between the conveyor 10 and the actuator 20, it is preferable that on the front lower surface of the upper transport frame 232, the cylinder body 222 of the lifting cylinder 220 is detachably fixed in a state that is moved up and down by the operator to be adjusted in position.

To this end, as shown in FIG. 4, a plurality of guide slits 234 extending a certain length in the vertical direction of the lifting cylinder 220 may be formed at regular intervals from one side to the other side of the upper transport frame 232 in the front lower part of the upper transport frame 232.

In addition, on the front lower surface of the upper transport frame 232, the cylinder body 222 of the lifting cylinder 220 may be detachably fixed in a state that is moved up and down by the operator to be adjusted in position, by means of a position fixing member 235 such as a bolt, which makes it possible to be detachably fastened to the cylinder body 222 of the lifting cylinder 220 using various methods such as screwing while penetrating the guide slit 234.

Figure 9:
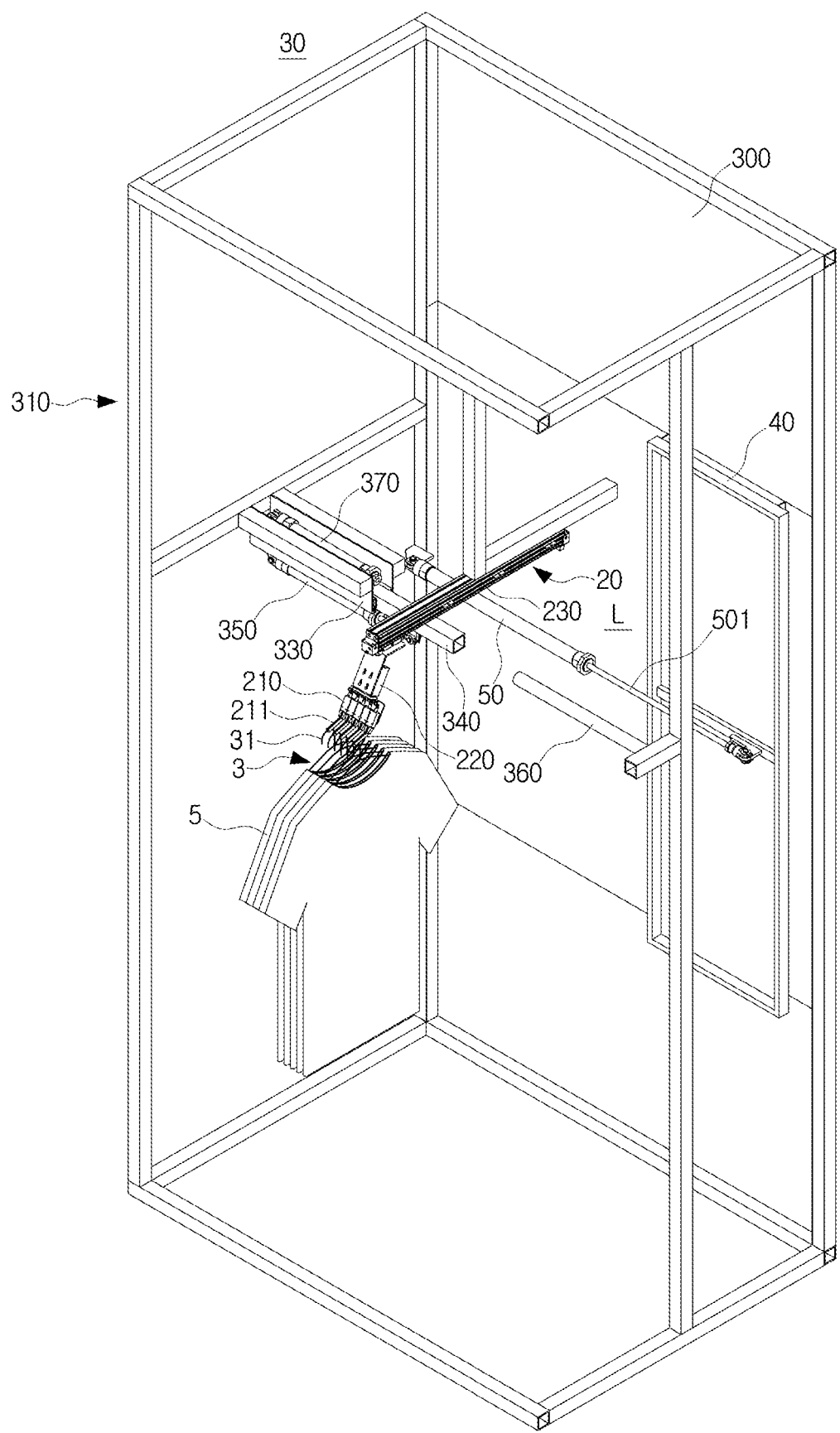
FIG. 9 is a perspective view schematically showing a support portion as an example.

FIG. 9 is a perspective view schematically showing support portion as an example.

As shown in FIG. 9, a support portion 30 may be provided to receive a hanger 3 with laundry 5 requested for delivery separated from the conveyor 10 through the actuator 20 and support it at a certain height.

The support portion 30 may be configured to include, for example, a frame 310, an auxiliary frame 320, a guide frame 330, a moving frame 340, a lower cylinder 350, a support frame 360, and an upper cylinder 370.

Here, one side, the other side, the upper, the lower, and the front of the frame 310 are open; at least the front of the frame 310 may be open; or a space corresponding to the shipping position L may be formed inside the frame 310.

FIGS. 10 to 16 are perspective views sequentially showing the process in which a hanger with laundry requested for delivery is positioned at a certain height in a space corresponding to the shipping position formed inside a support portion as an example.

Figure 10:
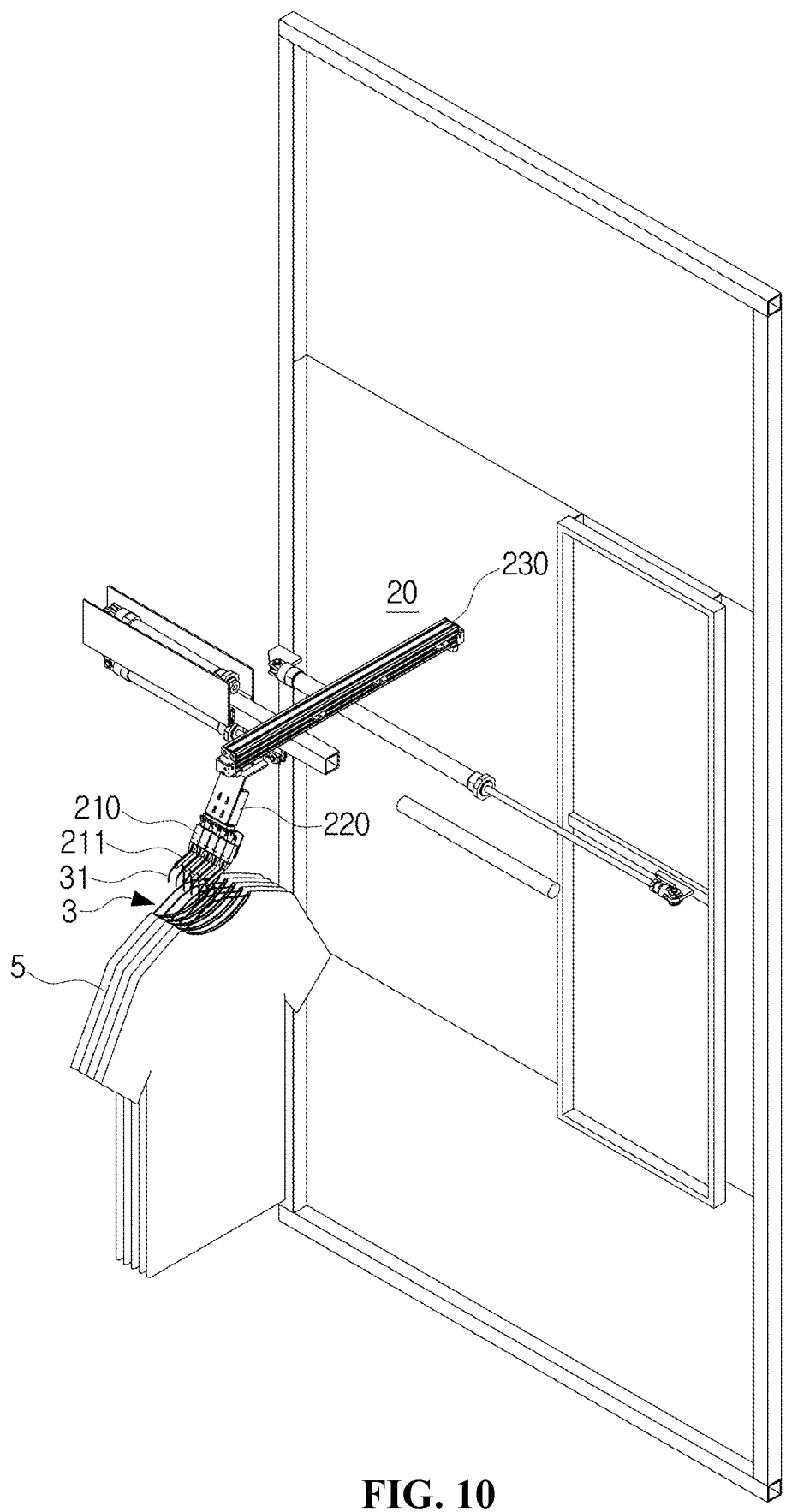
FIGS. 10 to 16 are perspective views sequentially showing the process in which a hanger with the laundry requested for delivery are positioned at a certain height in a space corresponding to the shipping position formed inside the support portion as an example.
Figure 11:
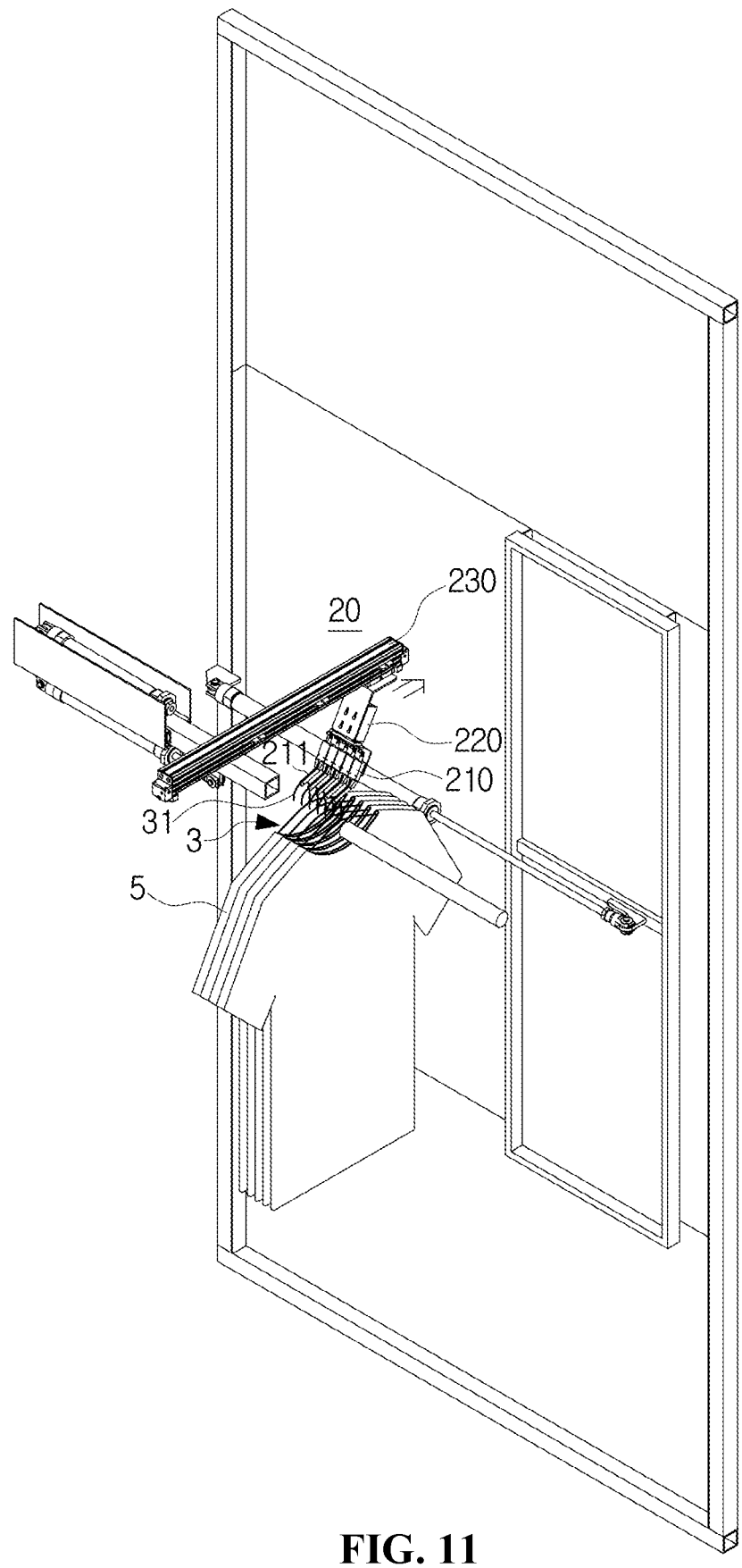

The hanger 3 with the laundry 5 requested for delivery separated from the conveyor 10 by the actuator 20 may be transported at a certain height to the space corresponding to the shipping position L formed inside the frame 310, as shown in FIGS. 9 to 11.

As shown in FIG. 9, in order to ensure that the lower part of the auxiliary frame 320 is positioned at a certain height inside the frame 310, the upper part of the auxiliary frame 320 may be fixed to the front upper middle part of the frame 310 using various methods, such as bolting or welding, or may be eccentrically fixed to the front upper part of the frame 310 using various methods, such as bolt fixing or welding fixation.

As shown in FIG. 9, the transport cylinder 230 of the actuator 20, which extends a certain length in the front and rear directions of the frame 310, may be horizontally provided at a certain height in the bottom of the auxiliary frame 320, using various methods such as bolt fixation or welding fixation.

The guide frame 330 may be formed to extend left and right a certain length from one side to the other side of the frame 310, as shown in FIG. 9.

The guide frame 330 may be horizontally fixed to the upper middle portion in one side of the frame 310 at a certain height using various methods, such as bolting or welding.

Here, one side, the other side, and the top of the guide frame 330 may be open, or at least the top and the other side of the guide frame 330 may be open.

The moving frame 340 may be provided horizontally in the guide frame 330 so that it may move left and right from one side to the other side of the guide frame 330 and from the other side to the one side of the guide frame 330, as shown in FIG. 9.

The moving frame 340 may be made of various types, such as a hollow square pipe.

The other side opposite to one side of the moving frame 340, may be exposed outward a certain length in the other side of the guide frame 330.

Figure 12:
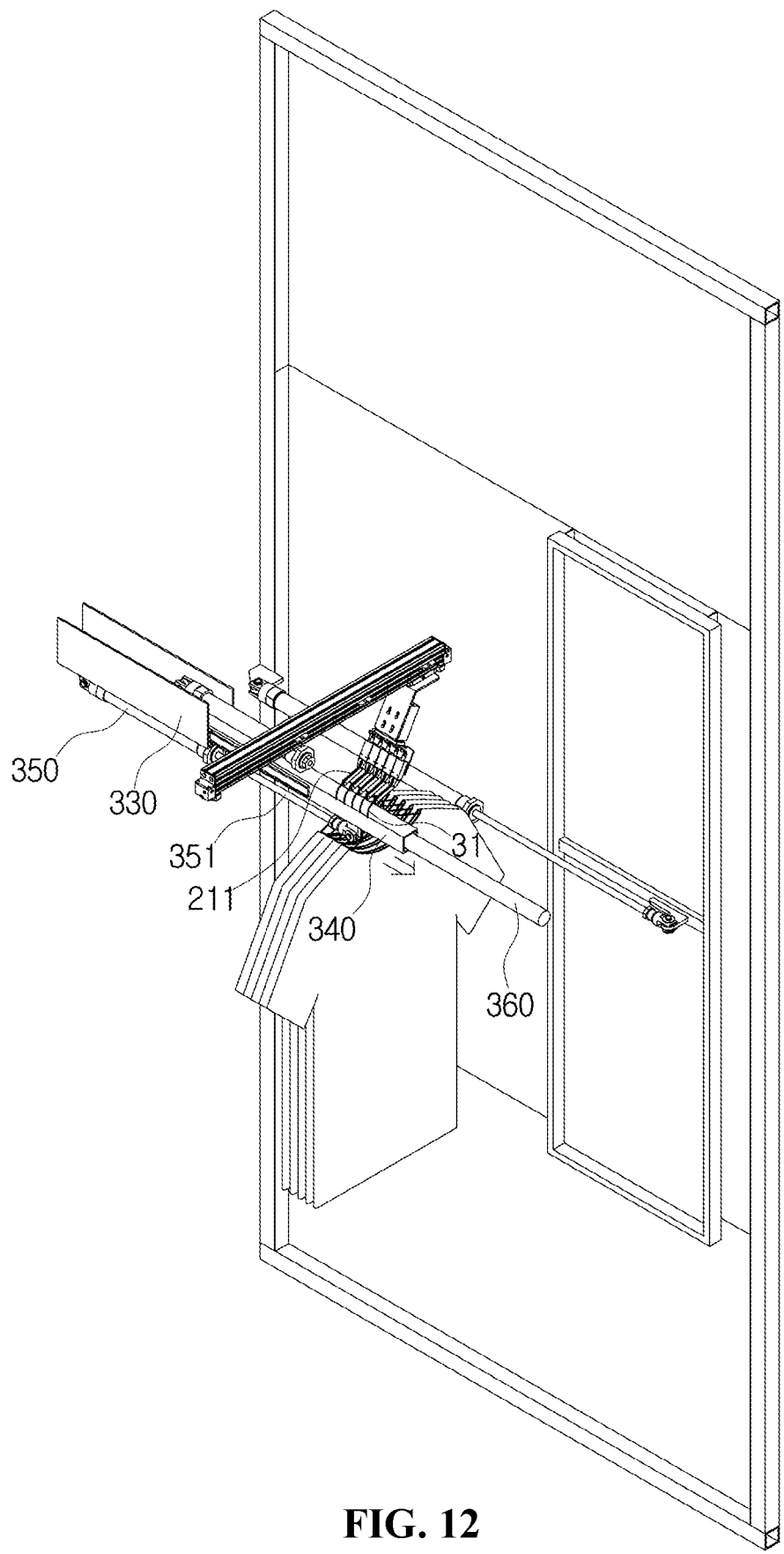

In a state that the hanger 3 with the laundry 5 requested for delivery, which is separated from the conveyor 10 by the actuator 20, is transported at a certain height to the space corresponding to the shipping position L formed inside the frame 310, as shown in FIGS. 9 to 11, the moving frame 340 may be moved outward in the other side of the guide frame 330 and pulled out from the guide frame 330, as shown in FIG. 12.

Figure 13:
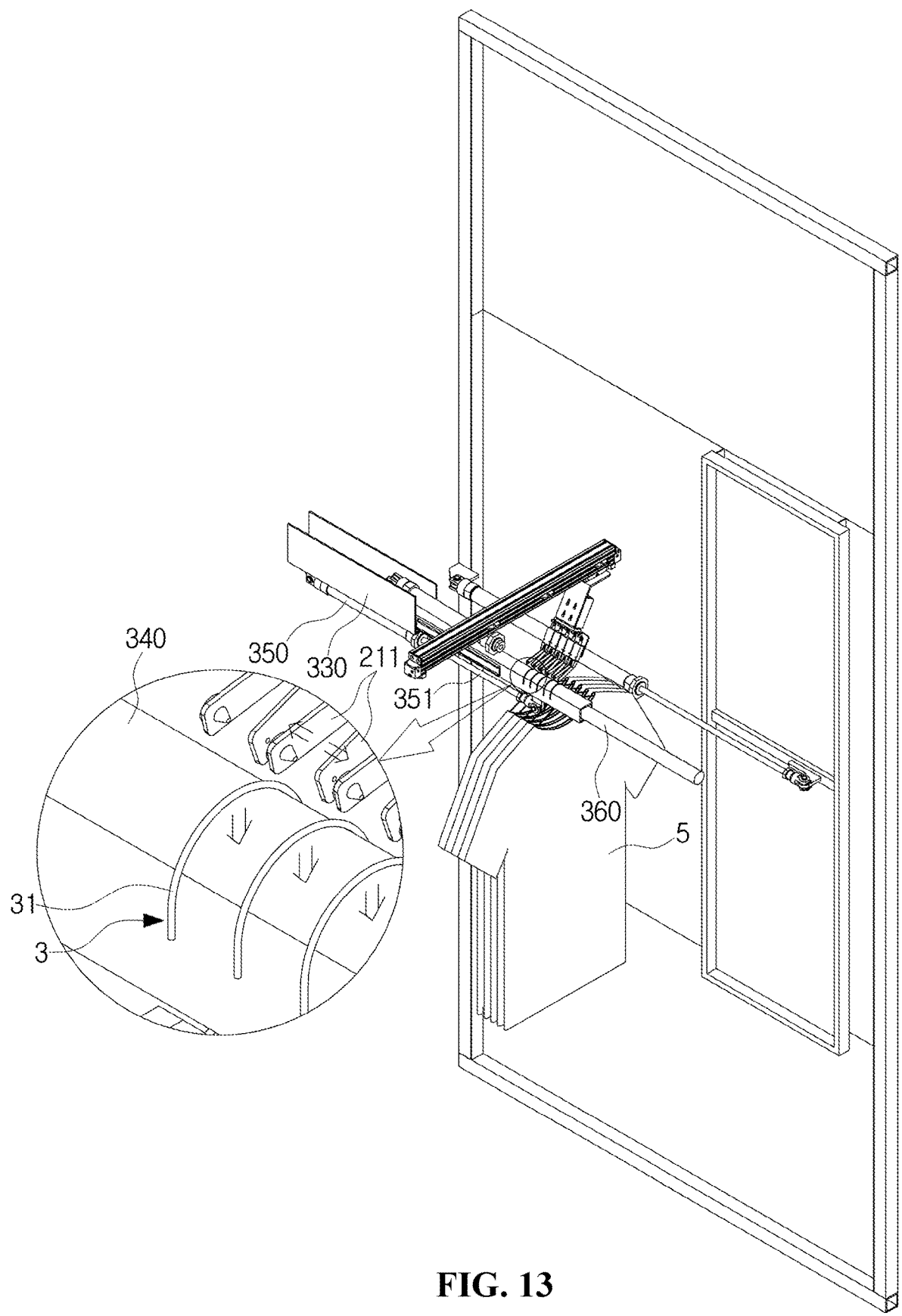

Here, when the pair of fingers 211 of the cylinder 210 of the actuator 20, is released from the state of gripping the hook 31 of the hanger 3 with the laundry 5 requested for delivery, as shown in FIG. 13, the moving frame 340 may be accommodated inside the hook 31 of the hanger 3 as the hook 31 of the hanger 3 with the laundry 5 requested for delivery is lowered, so that the moving frame 340 may receive the laundry 5 requested for delivery that are separated from the conveyor 10 through the actuator 20 and stably support it at a certain height.

Figure 14:
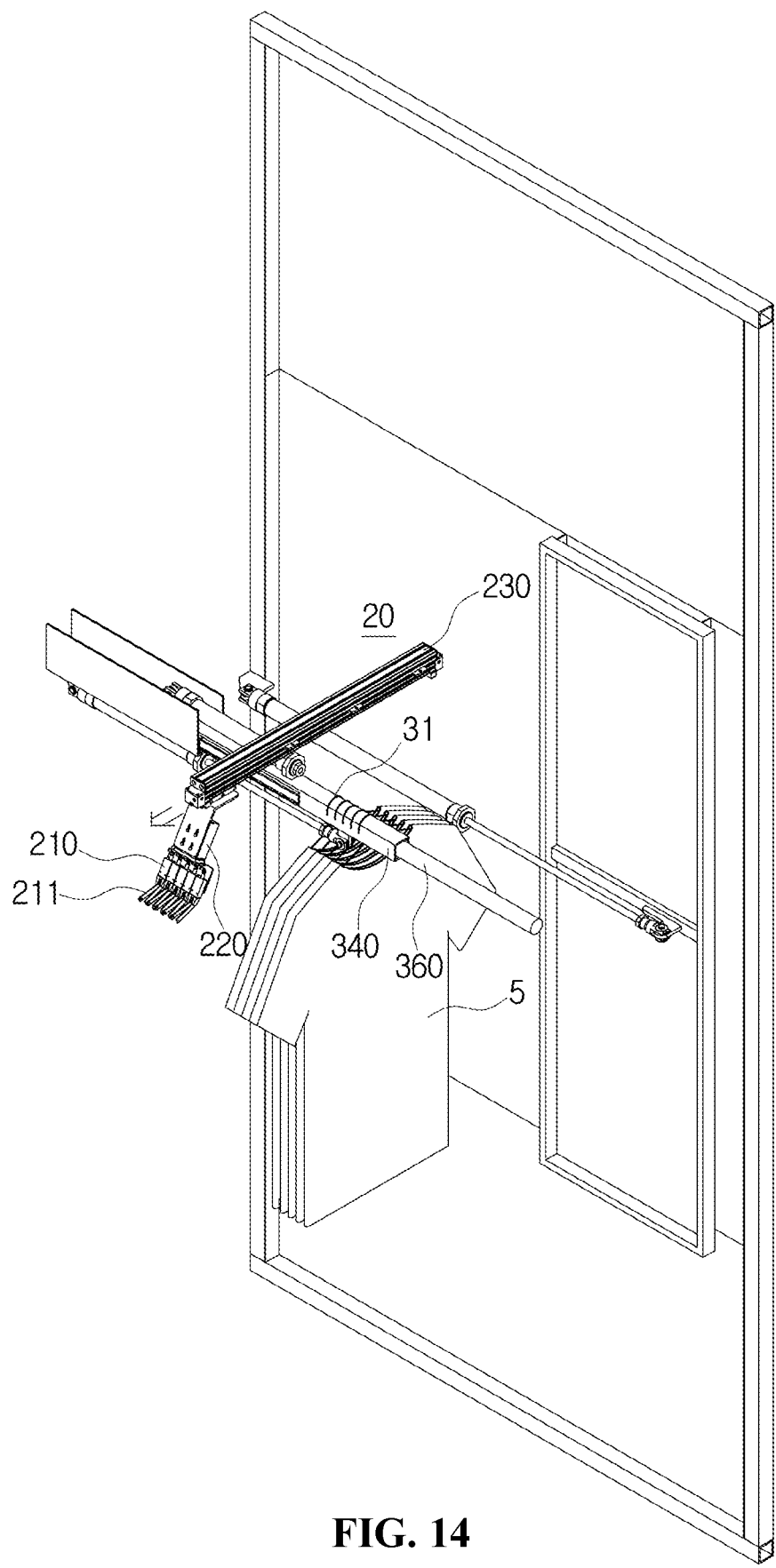

In a state that the laundry 5 requested for delivery is supplied to the moving frame 340, the cylinder 210 of the actuator 20 may be moved in the front direction of the transport cylinder 230 by the transport cylinder 230 and returned to the original position, as shown in FIG. 14.

The lower cylinder 350 may be horizontally provided in the lower part of the guide frame 330 using various methods, such as bolting or welding.

The other side opposite to one side of the rod 351 of the lower cylinder 350 may be coupled to the lower part of the other side of the moving frame 340 which is exposed outward a certain length in the other side of the guide frame 330, using various methods such as shaft coupling or bolt coupling.

By expanding and contracting the length of the rod 351 of the lower cylinder 350, the moving frame 340 may be moved from one side to the other side of the guide frame 330 and from the other side to one direction of the guide frame 330.

The support frame 360 may extend a certain length from one side to the other side of the frame 310, as shown in FIG. 9.

The support frame 360 may be horizontally provided at a certain height in the upper middle portion of the other side of the frame 310 in various methods, such as bolting or welding.

The support frame 360 may be made of various types, such as a hollow circular pipe or a solid round bar.

One side of the support frame 360 may be inserted a certain length into the other side of the moving frame 340 pulled out from the guide frame 330.

The upper cylinder 370 may be horizontally mounted on one side of the moving frame 340 using various methods, such as bolting or welding, and thus moved left and right together with the moving frame 340.

Figure 15:
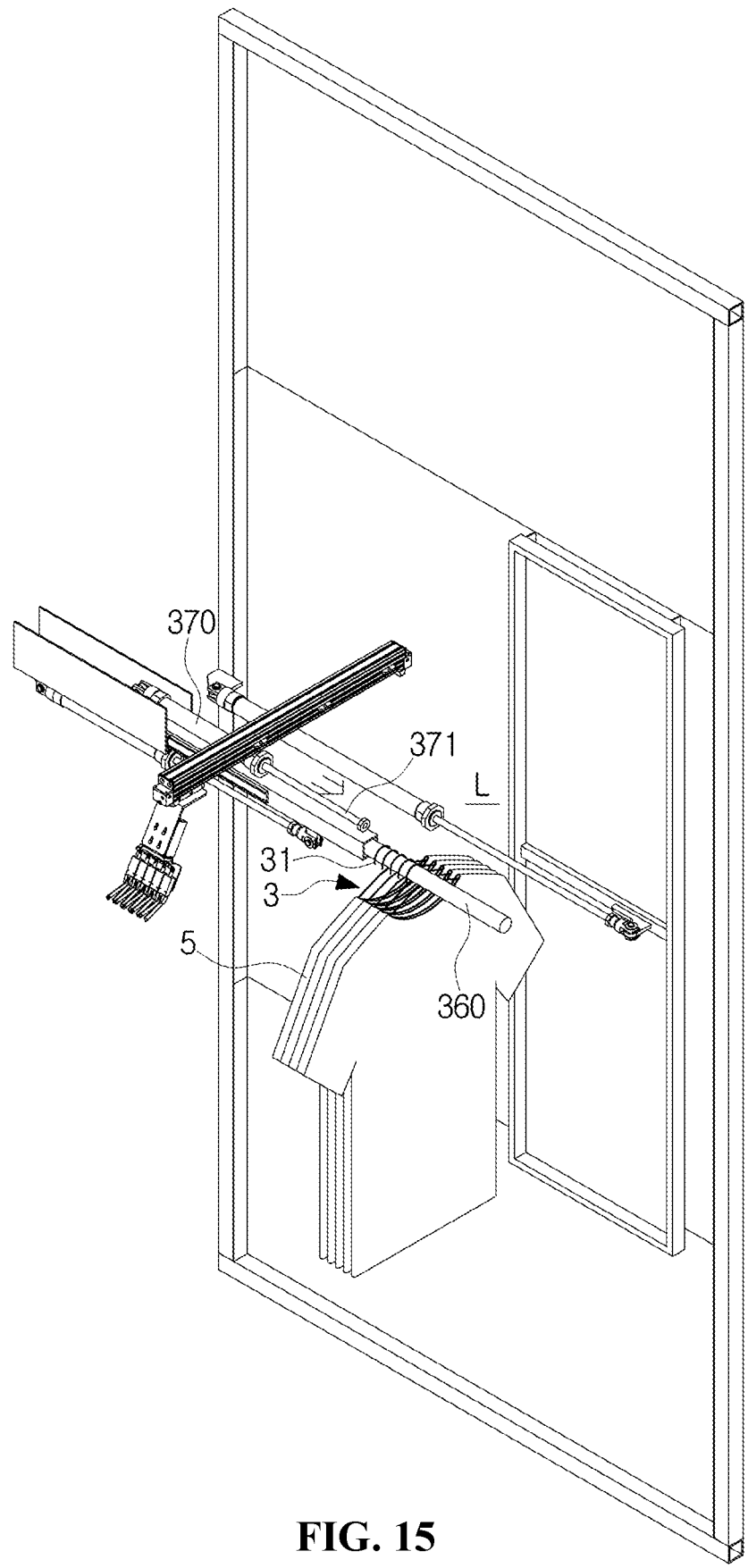

As the length of the rod 371 of the expandable upper cylinder 370 increases, the other side opposite to one side of the rod 371 of the upper cylinder 370 pushes the hook 31 of the hanger 3 with the laundry 5 which is supported at a certain height by the moving frame 340 towards the support frame 360, as shown in FIGS. 14 and 15, whereby the laundry 5 requested for delivery may be supplied from the moving frame 340 and supported at a certain height in a state that the support frame 360 is accommodated inside the hook 31 of the hanger 3 on which the laundry 5 requested for delivery is hanged.

In addition, as shown in FIG. 9, the panel member 300 may be vertically provided on the rear side of the frame 310 of the support portion 30 using various methods, such as bolting or welding.

Figure 16:
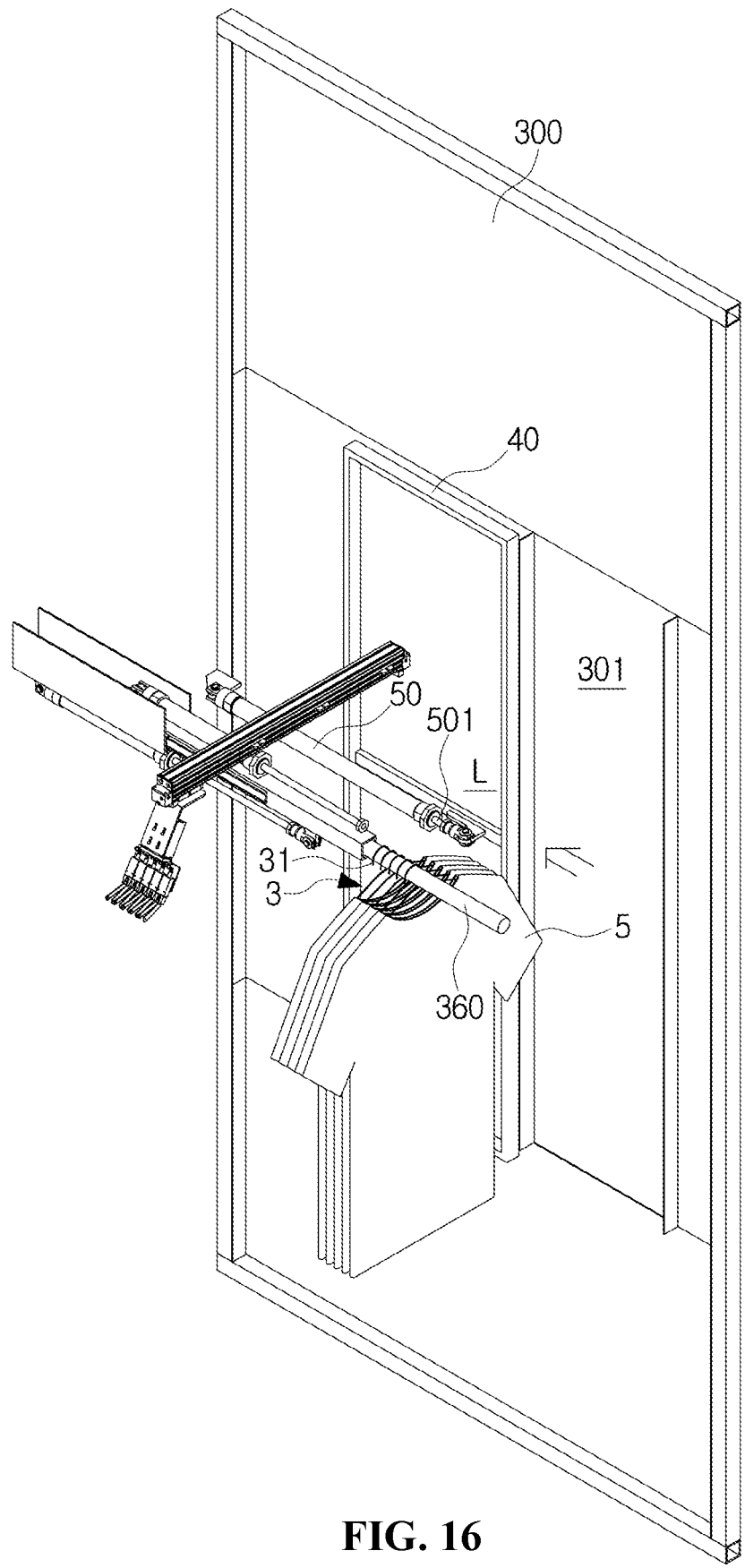

As shown in FIG. 16, an opening 301 communicating with the space corresponding to the shipping position L formed inside the frame 310 of the support portion 30 may be formed in the middle portion of the other side opposite to one side of the panel member 300.

In addition, at the middle part of the other side in the front of the panel member 300, a door 40 that opens and closes the space corresponding to the shipping position L may be provided to be capable of left and right sliding from one side to the other side of the panel member 300 and from the other side to one side of the panel member 300.

Although not shown in the drawing, at the lower part of the other side in the front of the panel member 300, a guide rail that guides the left and right sliding movement of the panel member 300 while the lower part of the panel member 300 seated and supported may be provided at a certain height to be horizontally extended a certain length from one side to the other direction of the panel member 300.

Furthermore, a door cylinder 50 may be provided to enable the left and right sliding movement of the door 40 at the rear of the frame 310 of the support portion 30.

One side of the door cylinder 50 may be axially coupled to one middle portion of the rear of the frame 310 of the support portion 30.

The other side opposite to one side of the rod 501 of the door cylinder 50 may be axially coupled to the front of the other side opposite to the one side of the door 40.

As the rod 501 of the door cylinder 50 extends and contracts in length, the door 40 may slide left and right to open and close the opening 301 of the panel member 300.

In a state where the door 40 opens the opening 301 of the panel member 300, the customer may withdraw the laundry 5 requested for delivery from the inside of the frame 310 of the support portion 30.

As described above, the present invention has an effect that can automatically separate, from the conveyor 10 through the actuator 20, the hanger 3 with the laundry 5 requested for delivery which has been transferred by the conveyor 10 to the shipping location L, without the need for the worker to manually separate the laundry, so that it may be delivered to the customers, thereby greatly improving the work efficiency of the worker.

Figure 17:
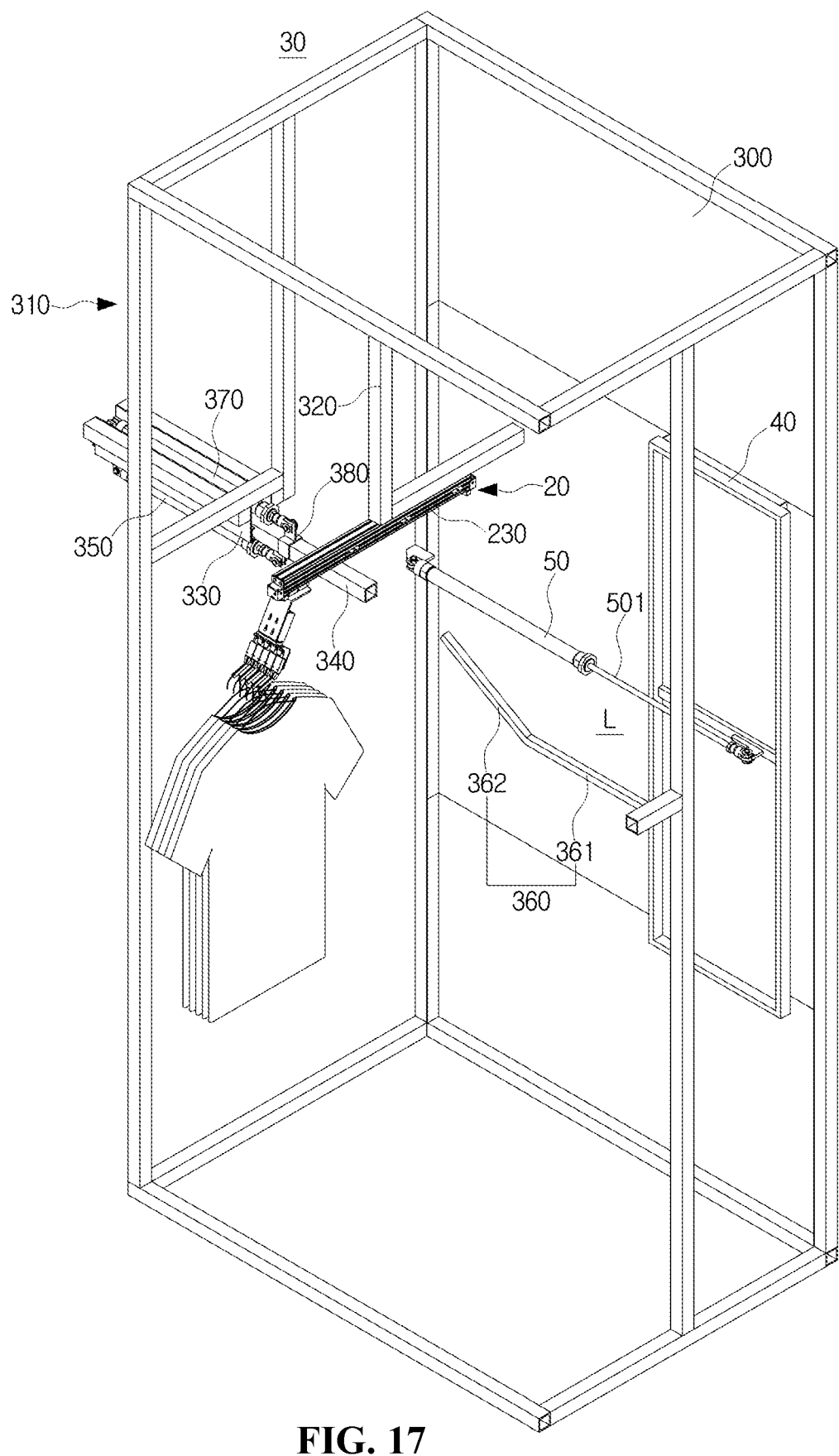
FIG. 17 is a perspective view schematically showing a support portion as another example.
Figure 18:
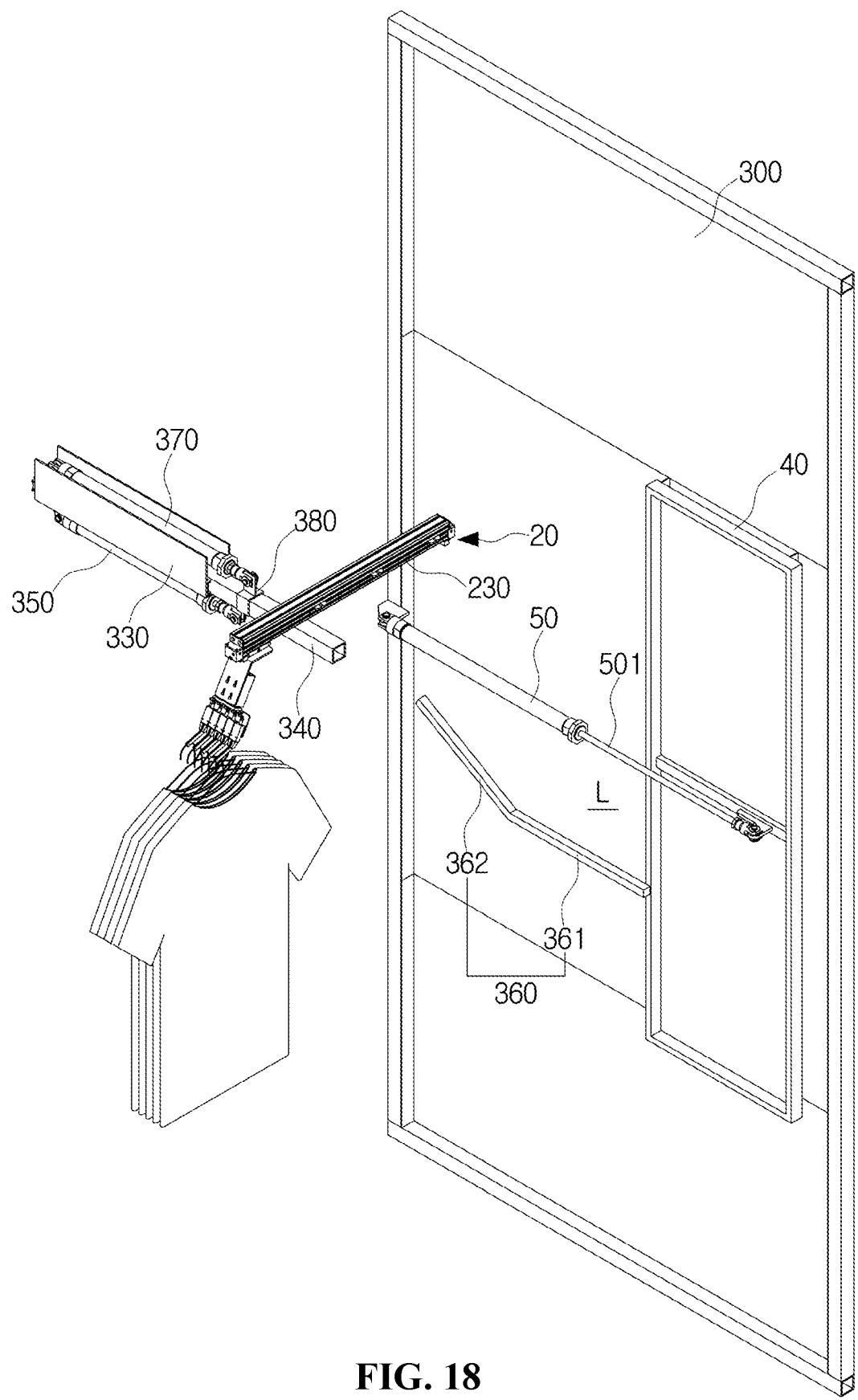
FIGS. 18 to 24 are perspective views sequentially showing a process in which a hanger with the laundry requested for delivery is positioned at a certain height in a space corresponding to the shipping position formed inside the support portion as another example.
Figure 19:
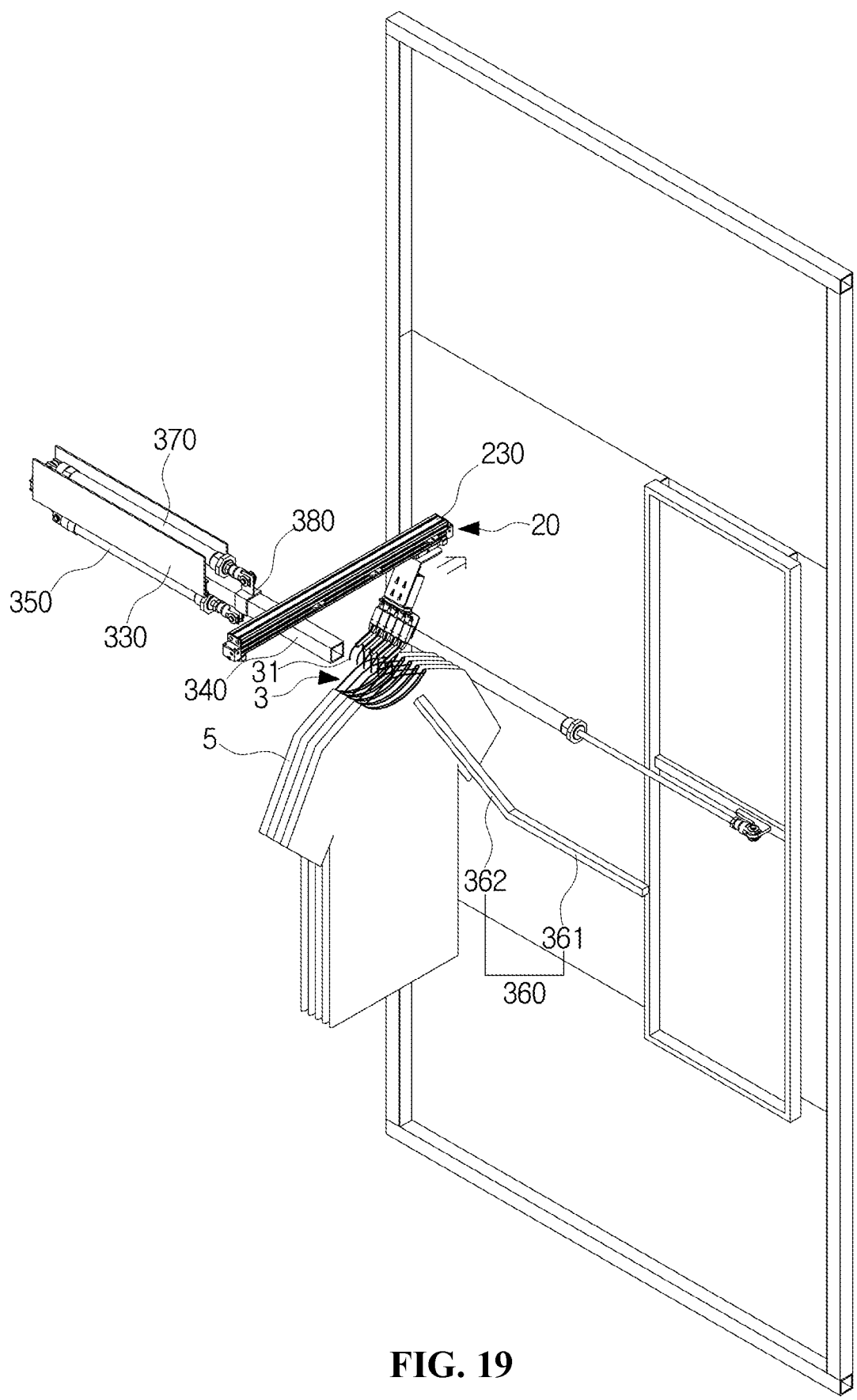

FIG. 17 is a perspective view schematically showing a support portion as another example; and FIGS. 18 to 24 are perspective views sequentially showing a process in which a hanger with laundry requested for delivery is positioned at a certain height in a space corresponding to the shipping position formed inside the support portion as another example.

Here, because the height of the support frame 360 is high in the case of the support portion 30 as an example, a problem may arise where it is difficult for a short customer to easily retrieve the laundry 5 requested for delivery from the inside of the frame 310.

Therefore, in order to ensure that the height of the support frame 360 of the support portion 30 is relatively lowered so that even the short customer may easily withdraw the laundry 5 requested for delivery from the inside of the frame 310 of the support part 30, the support portion 30 as another example, is configured to include the frame 310, the auxiliary frame 320, the guide frame 330, the moving frame 340, the lower cylinder 350, the support frame 360, and the upper cylinder 370, in which the base support frame 360 may be configured with a horizontal support frame 361 and an inclined support frame 362.

In order to ensure that the height of the horizontal support frame 361 is lower than the height of the guide frame 330, the horizontal support frame 361 may be horizontally installed at a certain height at the middle portion of the other side of the frame 310 using various methods, such as bolting or welding.

The inclined support frame 362 may be formed to be inclined upward a certain length from one side of the horizontal support frame 361 to the other side opposite to one side of the movable frame 340.

Figure 20:
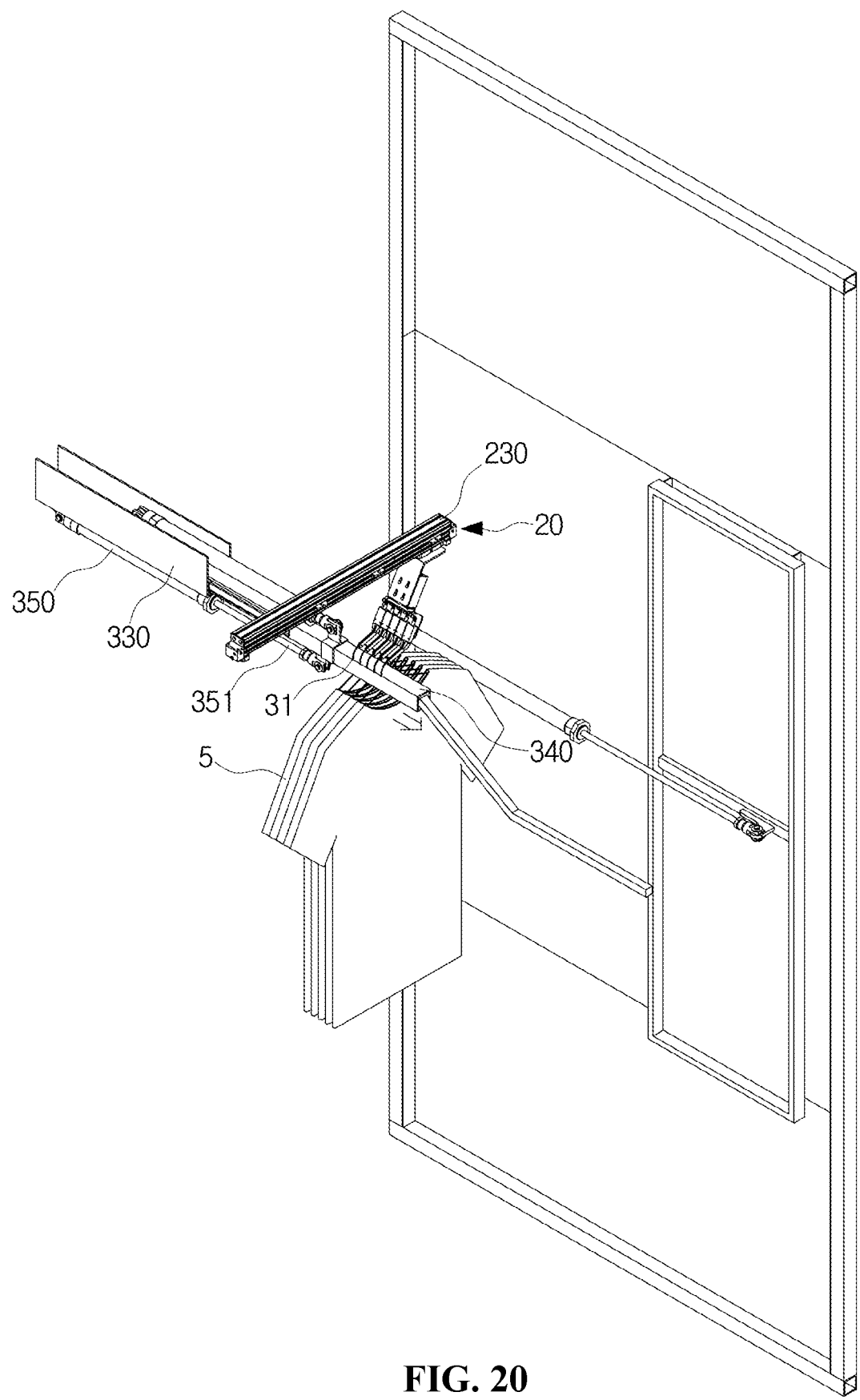
Figure 21:
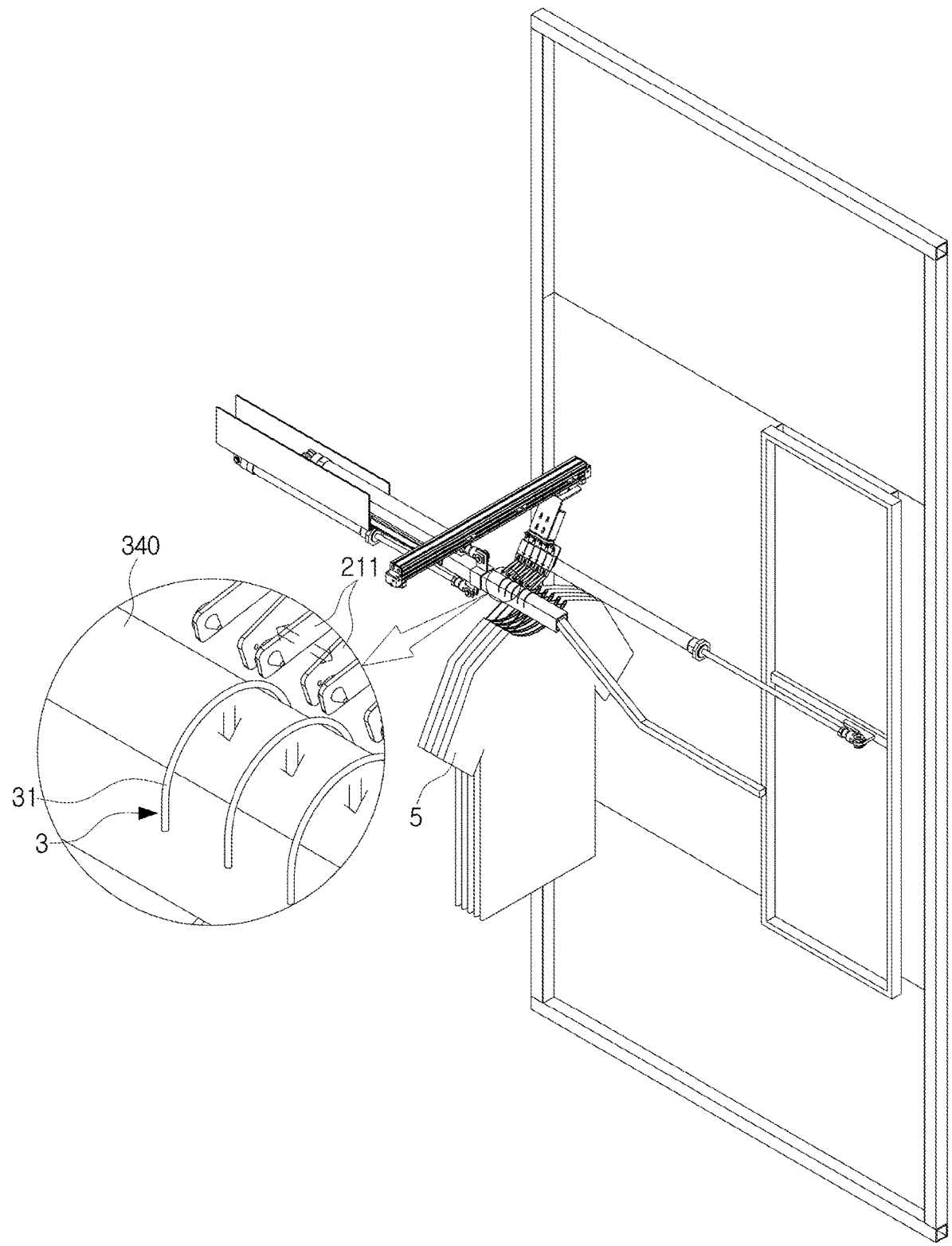

As shown in FIG. 20, as the moving frame 340 moves to the other side of the guide frame 330, a portion of one side of the inclined support frame 362 may be inserted into the other side of the moving frame 340 pulled out from the guide frame 330.

Figure 22:
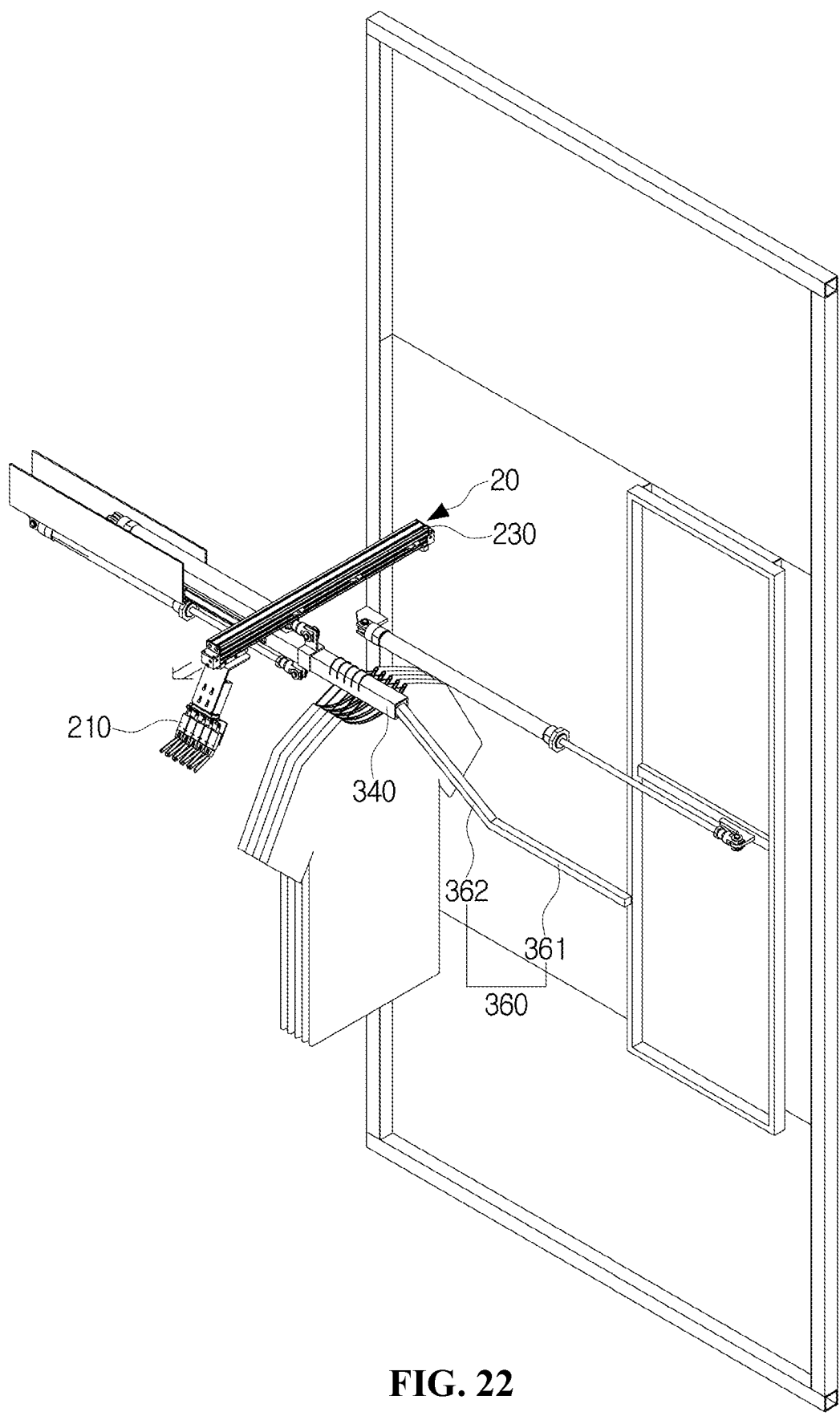
Figure 23:
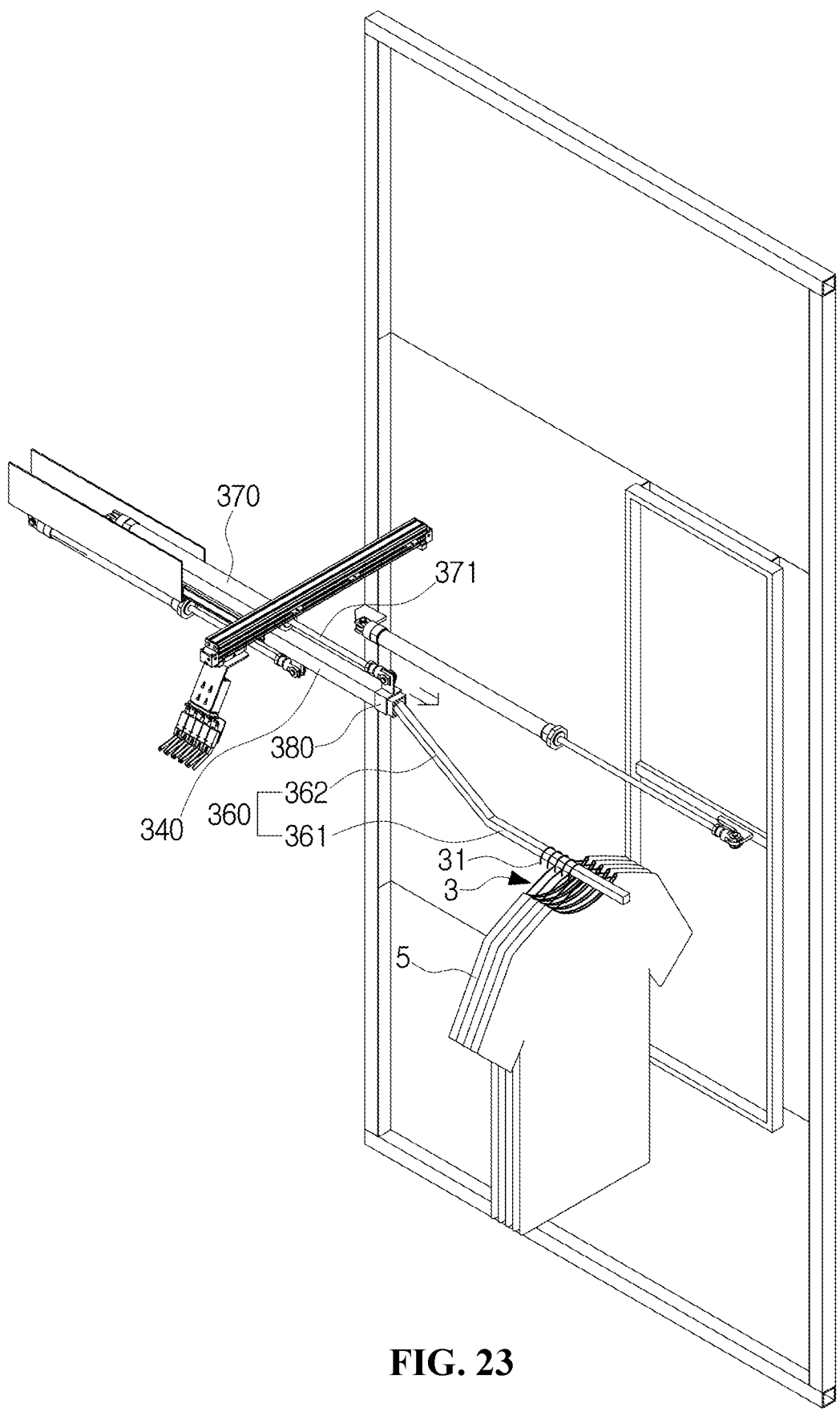
Figure 24:
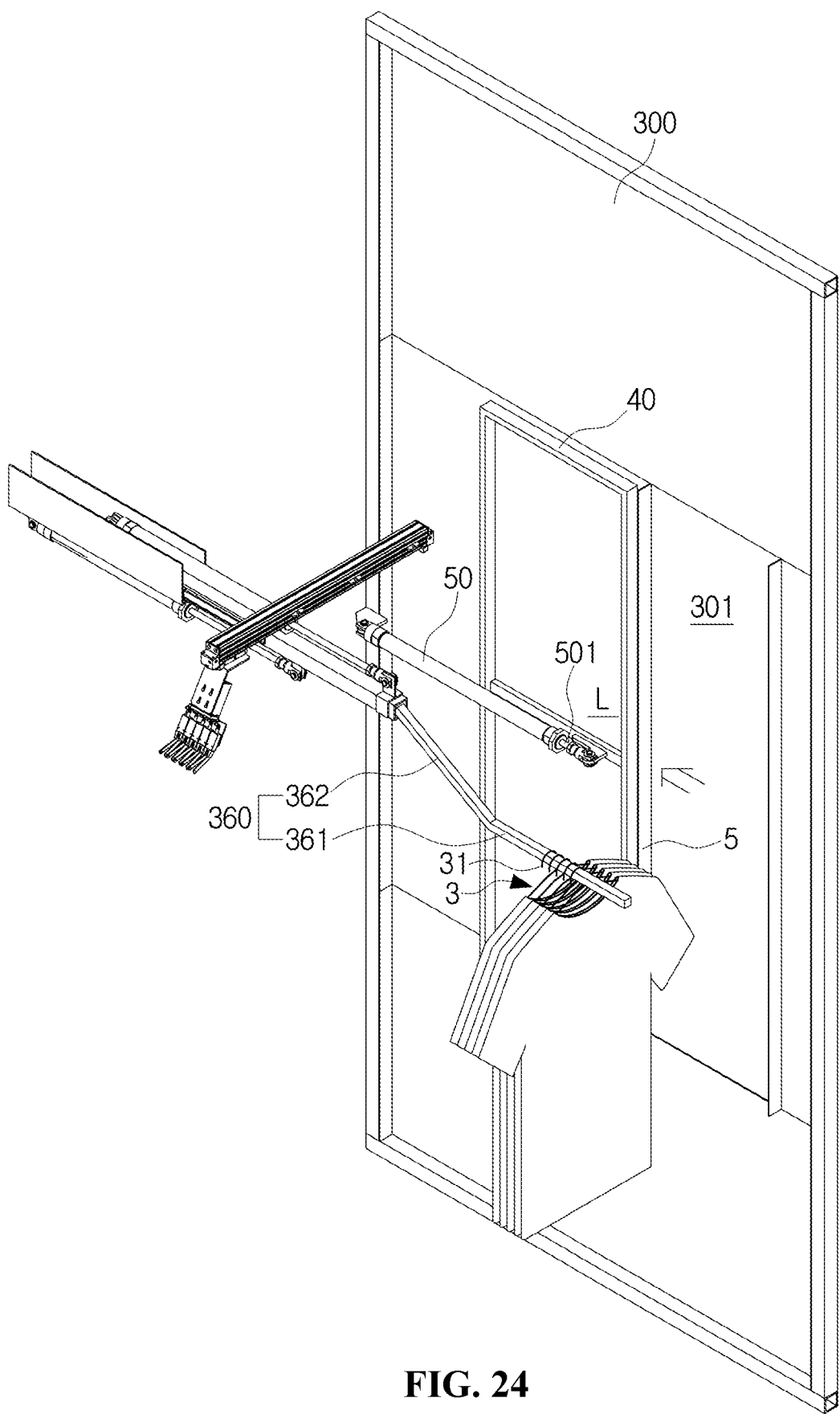

As shown in FIGS. 22 and 23, as the rod 371 of the upper cylinder 370 increases in length, the other side of the rod 371 pushes and moves the hook 31 of the hanger 3 with the laundry 5 which is supported at a certain height by the moving frame 340, in the direction of the support frame 360, whereby the hook 31 of the hanger 3 with the laundry 5 may be moved to the horizontal support frame 361 via the inclined support frame 362 of the support frame 360.

Here, in order to allow the hanger 3 with the laundry 5 requested for delivery to be moved more easily from the moving frame 340 to the support frame 360, the support portion 30 in one example or another example may be configured to further include an auxiliary moving frame 380, as shown in FIG. 23.

The upper part of the auxiliary movable frame 380 may be connected to the other side of the rod 371 of the upper cylinder 370 using various methods, such as shaft coupling, bolt fixation, and welding fixation so that the auxiliary moving frame 380 may be provided on the other side opposite to one side of the rod 371 of the upper cylinder 370.

The front and rear sides of the auxiliary movable frame 380 may each be formed to be vertically bent in the lower direction of the movable frame 340, and the moving frame 340 may be accommodated inside the auxiliary moving frame 380.

The auxiliary moving frame 380 may move from one side to the other side of the moving frame 340 and move from the other side to one side of the moving frame 340, by expanding and contracting the length of the rod 371 of the upper cylinder 370.

The hook 31 of the hanger 3 with the laundry 5 supported at a certain height by the moving frame 340 may be moved to the horizontal support frame 361 via the inclined support frame 362 of the support frame 360 by the auxiliary moving frame 380 moving from one side to the other side of the moving frame 340.

What is claimed is:

1. A laundry delivery device, comprising:
   a conveyor transporting a hanger with laundry requested for delivery to a shipping location; and
   an actuator including a cylinder that grips and releases a hook of the hanger with the laundry requested for delivery through a finger provided on a front of the cylinder, and configured to move up and down in a state that is inclined downward toward a bottom of the conveyor; a lifting cylinder disposed to be inclined downward along the cylinder to lift the cylinder; and a transport cylinder including a carrier that transports the cylinder in forward and backward directions together with the lifting cylinder, so that the hanger with the laundry requested for delivery transferred to the shipping location by the conveyor is separated from the conveyor.

2. The laundry delivery device of claim 1, wherein the conveyor includes a slot for hanging the hook of the hanger with the laundry requested for delivery.

3. The laundry delivery device of claim 1, wherein the finger of the cylinder comprises a pair of fingers;
   a mounting shaft is provided in a front of one of the pair of fingers in a state of horizontally penetrating the front of the one finger to allow the hook of the hanger with the laundry requested for delivery to be mounted; and
   an insertion hole into which the mounting shaft is inserted is formed on a front of the other finger of the pair of fingers.

4. The laundry delivery device of claim 3, wherein an inclined surface is formed to be gradually inclined toward an inside of the mounting shaft as it moves from the front of the one finger to the front of the other finger, on an outer peripheral surface of the mounting shaft located between the front of the one finger and the front of the other finger.

5. The laundry delivery device of claim 4, wherein an inclined surface is formed to be inclined along the inclined surface of the mounting shaft on an inner peripheral surface of the insertion hole formed on the front of the other finger.

6. The laundry delivery device of claim 1, wherein the cylinder comprises a plurality of cylinders; and
the transport cylinder comprises:
an upper transport frame which has a rear fixed to the carrier and a front fixed to the lifting cylinder and is configured to be transported in forward and backward directions together with the lifting cylinder and the cylinder by the carrier; and
a lower transport frame which has a rear connected to a rod of the lifting cylinder and a plurality of the cylinders provided at regular intervals on an upper surface and is configured to be transported in forward and backward directions together with the upper transport frame.

7. The laundry delivery device of claim 6, wherein:
the front of the upper transport frame is inclined downward toward a bottom of the conveyor; and
the lifting cylinder is configured to move up and down on the front of the upper transport frame to be fixed in an adjusted position.

8. The laundry delivery device of claim 7, wherein:
a guide slit extending a length in a vertical direction of the lifting cylinder is formed on the front of the upper transport frame; and
the lifting cylinder is configured to move up and down on the front of the upper transport frame to be fixed in the adjusted position by a position fixing member fastened to the lifting cylinder in a state that penetrates the guide slit.

9. The laundry delivery device of claim 1, further comprising a support portion configured to receive the hanger with the laundry requested for delivery separated from the conveyor through the actuator and supporting the hanger at a height.

10. The laundry delivery device of claim 9, wherein the support portion comprises:
a frame allowing the hanger with the laundry requested for delivery separated from the conveyor by the actuator to be transported at a height to the shipping location formed inside the frame;
an auxiliary frame provided on an upper part of the frame and having the actuator provided on a lower part thereof;
a guide frame extending a length from one side to another side of the frame to be horizontally fixed at a height to the one side of the frame;
a moving frame provided inside the guide frame, configured to move left and right from one side to another side of the guide frame or from the another side to the one side of the guide frame, and configured to be accommodated inside the hook of the hanger with the laundry requested for delivery to support, at a height, the laundry requested for delivery separated from the conveyor after receipt thereof through the actuator;
a lower cylinder provided at a lower part of the guide frame and configured to move the moving frame from the one side to the another side of the guide frame or from the another side to the one side of the guide frame;
a support frame horizontally provided at a height on the another side of the frame and configured to be accommodated inside the hook of the hanger with the laundry requested for delivery to support, at a height, the laundry requested for delivery after receipt thereof from the moving frame; and
an upper cylinder provided on an upper part of the moving frame, configured to move left and right together with the moving frame, and configured to move the hanger with the laundry requested for delivery from the moving frame toward the support frame.

11. The laundry delivery device of claim 10, wherein the support frame comprises:
a horizontal support frame provided horizontally at a height on the another side of the frame; and
an inclined support frame formed to be inclined upward at a length from one side of the horizontal support frame to one side of the moving frame.

12. The laundry delivery device of claim 10, wherein the support portion further comprises an auxiliary moving frame that is configured to move from one side to another side of the moving frame or from the another side to the one side of the moving frame by the rod of the upper cylinder in a state that is provided in the rod of the upper cylinder and has the moving frame accommodated inside, so that the hanger with the laundry requested for delivery can be moved from the moving frame toward the support frame.

13. The laundry delivery device of claim 9, wherein a door is provided on a rear of the support portion to open and close the shipping location formed inside the support portion.

14. The laundry delivery device of claim 13, further comprising:
a door cylinder provided to move the door from one side to another side of the support portion or from the another side to the one side of the support portion at the rear of the support portion.

* * * * *